US011698292B2

(12) United States Patent
Deng et al.

(10) Patent No.: US 11,698,292 B2
(45) Date of Patent: Jul. 11, 2023

(54) SENSING DEVICES

(71) Applicant: SHENZHEN SHOKZ CO., LTD., Guangdong (CN)

(72) Inventors: Wenjun Deng, Shenzhen (CN); Yongshuai Yuan, Shenzhen (CN); Wenbing Zhou, Shenzhen (CN); Yujia Huang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 17/812,179

(22) Filed: Jul. 13, 2022

(65) Prior Publication Data
US 2023/0013504 A1 Jan. 19, 2023

Related U.S. Application Data

(63) Continuation of application No. PCT/CN2021/106947, filed on Jul. 16, 2021.

(51) Int. Cl.
G01H 11/06 (2006.01)
H04R 9/08 (2006.01)

(52) U.S. Cl.
CPC ............ G01H 11/06 (2013.01); H04R 9/08 (2013.01)

(58) Field of Classification Search
CPC .................................. G01H 11/06; A47D 5/00
USPC .......................................................... 73/658
See application file for complete search history.

(56) References Cited

U.S. PATENT DOCUMENTS

| 8,599,025 | B2 * | 12/2013 | Cipriano | G01G 19/445 |
| | | | | 177/25.19 |
| 9,433,357 | B2 * | 9/2016 | Yuen | G16H 40/63 |
| 10,527,484 | B2 * | 1/2020 | Bottomly | G01G 19/44 |
| 10,722,405 | B2 * | 7/2020 | Pepin | A61F 13/42 |
| 2010/0089665 | A1 * | 4/2010 | Tanaka | G01G 23/3735 |
| | | | | 177/25.12 |

(Continued)

FOREIGN PATENT DOCUMENTS

| CN | 1494354 A | 5/2004 |
| CN | 1159950 C | 7/2004 |

(Continued)

OTHER PUBLICATIONS

International Search Report in PCT/CN2021/106947 dated Apr. 13, 2022, 10 pages.

(Continued)

Primary Examiner — Jacques M Saint Surin
(74) Attorney, Agent, or Firm — Metis IP LLC

(57) ABSTRACT

The embodiment of the present disclosure discloses a sensing device, comprising: an elastic component; a sensing cavity, wherein the elastic component forms a first sidewall of the sensing cavity; and an energy conversion component configured to obtain a sensing signal and convert the sensing signal into an electrical signal, the energy conversion component being in communication with the sensing cavity, and the sensing signal relating to a change of a volume of the sensing cavity, wherein at least one convex structure is arranged on one side of the elastic component facing toward the sensing cavity, the elastic component drives the at least one convex structure to move in response to an external signal, and the movement of the at least one convex structure changing the volume of the sensing cavity.

18 Claims, 9 Drawing Sheets

(56) References Cited

U.S. PATENT DOCUMENTS

| | | |
|---|---|---|
| 2014/0054104 A1 | 2/2014 | He et al. |
| 2015/0016656 A1 | 1/2015 | Chen et al. |
| 2016/0069734 A1* | 3/2016 | Harry, Jr. ............ G01G 19/445 177/1 |
| 2017/0006382 A1 | 1/2017 | Luzzato et al. |
| 2017/0094414 A1 | 3/2017 | Lembacher et al. |
| 2018/0073917 A1 | 3/2018 | Zhang et al. |

FOREIGN PATENT DOCUMENTS

| | | |
|---|---|---|
| CN | 105072551 A | 11/2015 |
| CN | 209314103 U | 8/2019 |
| CN | 209526834 U | 10/2019 |
| CN | 110536220 A | 12/2019 |
| CN | 110972045 A | 4/2020 |
| CN | 210641073 U | 5/2020 |
| CN | 210958708 U | 7/2020 |
| CN | 111531978 A | 8/2020 |
| CN | 111741418 A | 10/2020 |
| CN | 211930820 U | 11/2020 |
| CN | 211930871 U | 11/2020 |
| CN | 112637736 A | 4/2021 |
| RU | 198558 U1 | 7/2020 |
| TW | I626854 B | 6/2018 |

OTHER PUBLICATIONS

Written Opinion in PCT/CN2021/106947 dated Apr. 13, 2022, 12 pages.
Office Action in Russian Application No. 2022121169 dated Mar. 10, 2023, 14 pages.
The Extended European Search Report in European Application No. 21920144.9 dated Apr. 12, 2023, 10 pages.

* cited by examiner

SENSING DEVICES

CROSS-REFERENCE TO RELATED APPLICATIONS

This application is a continuation of International Application No. PCT/CN2021/106947, filed on Jul. 16, 2021, the contents of which are hereby incorporated by reference.

TECHNICAL FIELD

The present disclosure relates to sensors, more particularly, relates to a sensing device with at least one convex structure arranged on a film.

BACKGROUND

A sensing device is one of commonly used detection devices, which converts an acquired sensing signal into an electrical signal or information of other required forms for output through its internal energy conversion component. The sensitivity represents a ratio of an intensity of an output signal of the sensing device to an intensity of an input signal. If the sensitivity is too small, user experiences will be affected. When the sensing device works, the sensitivity of the sensing device relates to the volume and a volume change of a sensing cavity of the sensing device.

The present disclosure provides a sensing device, which may not only improve the reliability, but also the sensitivity of the sensing device effectively.

SUMMARY

A sensing device, comprising: an elastic component; a sensing cavity, wherein the elastic component forms a first sidewall of the sensing cavity; and an energy conversion component configured to obtain a sensing signal and convert the sensing signal into an electrical signal, the energy conversion component being in communication with the sensing cavity, and the sensing signal relating to a change of a volume of the sensing cavity, wherein at least one convex structure is arranged on one side of the elastic component facing toward the sensing cavity, the elastic component driving the at least one convex structure to move in response to an external signal, and the movement of the at least one convex structure changing the volume of the sensing cavity.

In some embodiments, the at least one convex structure abuts against a second sidewall of the sensing cavity, and the second sidewall is opposite to the first sidewall.

In some embodiments, the at least one convex structure has elasticity, when the at least one convex structure moves, the at least one convex structure producing elastic deformation, and the elastic deformation changing the volume of the sensing cavity.

In some embodiments, the at least one convex structure is arranged on at least part of a surface of the elastic component in an array.

In some embodiments, a shape of the at least one convex structure includes at least one of a pyramid shape, a hemispherical shape, or a striped shape.

In some embodiments, an interval between a pair of adjacent convex structures of the at least one convex structure is 1 µm-2000 µm.

In some embodiments, an interval between a pair of adjacent convex structures of the at least one convex structure is 10 µm-500 µm.

In some embodiments, a height of each of the at least one convex structure is 1 µm-1000 µm.

In some embodiments, a height of each of the at least one convex structure is 10 µm-300 µm.

In some embodiments, the elastic component includes an elastic film and an elastic microstructure layer, and the at least one convex structure is arranged on the elastic microstructure layer.

In some embodiments, the elastic microstructure layer and the elastic film are made of a same material.

In some embodiments, the elastic microstructure layer and the elastic film are made of different materials.

In some embodiments, a thickness of the elastic film is 0.1 µm-500 µm.

In some embodiments, a thickness of the elastic film is 1 µm-200 µm.

In some embodiments, a difference between a height of each of the at least one convex structure and a height of the sensing cavity is within 10%

In some embodiments, the sensing device further comprising: a mass unit arranged on a surface of the other side of the elastic component, the mass unit and the elastic component vibrating together in response to the external signal; and a shell accommodating the elastic component, the mass unit, the sensing cavity, and the energy conversion component.

In some embodiments, the energy conversion component is an acoustic transducer.

In some embodiments, the elastic component is arranged above the acoustic transducer, and the sensing cavity is formed between the elastic component and the acoustic transducer.

In some embodiments, an outer edge of the elastic component is fixedly connected with the acoustic transducer through a sealing component, and the elastic component, the sealing component, and the acoustic transducer jointly form the sensing cavity.

In some embodiments, an outer edge of the elastic component is fixedly connected with the shell, and the elastic component, the shell, and the acoustic transducer jointly form the sensing cavity.

In some embodiments, a thickness of the mass unit is 1 µm-1000 µm.

In some embodiments, a thickness of the mass unit is 50 µm-500 µm.

In some embodiments, a resonance frequency of a resonant system formed by the mass unit and the elastic component is 1500 Hz-6000 Hz.

In some embodiments, a resonance frequency of a resonant system formed by the mass unit and the elastic component is 1500 Hz-3000 Hz.

In some embodiments, the sensing device further comprising: another elastic component, the another elastic component and the elastic component being arranged on two sides of the mass unit symmetrically, and the another elastic component being fixedly connected with the shell.

A sensing element, comprising: an elastic component; and a first sensing cavity, wherein the elastic component forms a first sidewall of the first sensing cavity, wherein at least one convex structure is arranged on one side of the elastic component facing toward the first sensing cavity, the elastic component driving the at least one convex structure to move in response to an external signal, and the movement of the at least one convex structure changing a volume of the first sensing cavity.

In some embodiments, the sensing element is attached to a transducer, the transducer is placed opposing the elastic component to form a closed sensing cavity, and the transducer converts a volume change of the closed sensing cavity into an electrical signal.

A vibration sensing device, comprising: an elastic vibration component, including a diaphragm; an acoustic transducer, wherein an acoustic cavity is formed between the diaphragm and the acoustic transducer, the acoustic cavity being configured to obtain a sensing signal and convert the sensing signal into an electrical signal, and the sensing signal relating to a change of a volume of the acoustic cavity, wherein at least one convex structure is arranged on one side of the diaphragm facing toward the acoustic cavity, the elastic vibration component driving the at least one convex structure to move in response to an external signal, and the movement of the at least one convex structure changing the volume of the acoustic cavity.

A sensing element, comprising: an elastic component; and a sensing cavity, wherein the elastic component forms a first sidewall of the sensing cavity; wherein at least one convex structure is arranged on one side of the elastic component facing toward the sensing cavity, and Young's modulus of the at least one convex structure is 100 kPa-1 mPa, the elastic component causing at least one of movement and deformation of the at least one convex structure in response to an external signal, and the at least one of the movement and deformation of the at least one convex structure changing the volume of the sensing cavity.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
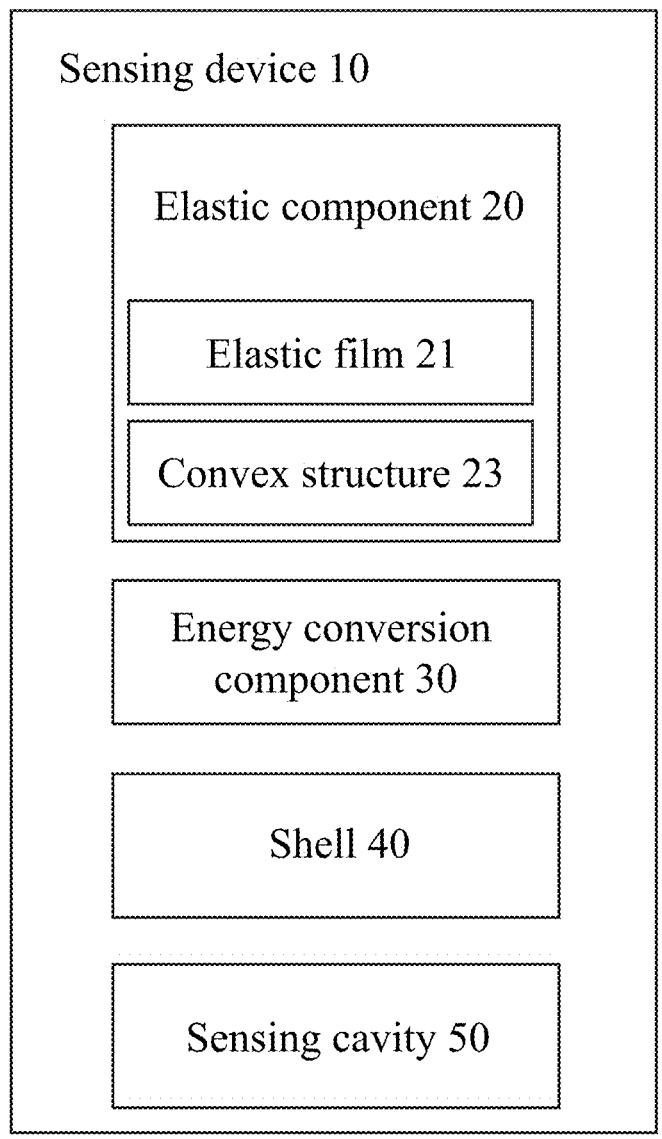
FIG. 1 is a schematic diagram illustrating an exemplary structural module diagram of a sensing device according to some embodiments of the present disclosure.

In order to illustrate the technical solutions relates to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. It should be understood that the exemplary embodiments are provided merely for better comprehension and application of the present disclosure by those skilled in the art, and not intended to limit the scope of the present disclosure. Unless obviously obtained from the context or the context illustrates otherwise, the same numeral in the drawings refers to the same structure or operation.

As used in the disclosure and the appended claims, the singular forms "a," "an," and "the" include plural referents unless the content clearly dictates otherwise. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements. The term "based on" is "based at least in part on." The term "one embodiment" represents "at least one embodiment"; The term "another embodiment" represents "at least one other embodiment." Related definitions of other terms may be given in the description below.

Some embodiments of the present disclosure relate to a sensing device. The sensing device may include an elastic component, a sensing cavity, and an energy conversion component. The elastic component forms a first sidewall of the sensing cavity. The energy conversion component may be connected to the sensing cavity, the energy conversion component may be configured to obtain a sensing signal and convert it into an electrical signal, the sensing signal may relate to a volume change of the sensing cavity. Sensitivity of the sensing device may increase with the decrease of volume of the sensing cavity and with the increase of the volume change. At least one convex structure may be arranged on one side of the elastic component facing toward the sensing cavity, the at least one convex structure may reduce the volume of the sensing cavity to increase the sensitivity of the sensing device. In some embodiments, the at least one convex structure may be configured to abut against a second sidewall of the sensing cavity, when the sensing device is in a working state, the elastic component may drive the at least one convex structure to vibrate and be squeezed by the second sidewall of the sensing cavity, resulting in elastic deformation. When the at least one convex structure generates an elastic deformation, the volume change of the sensing cavity may be improved, so as to improve the sensitivity of the sensing device. In addition, the existence of the at least one convex structure may effectively reduce a contact area between the elastic component and the second sidewall of the sensing cavity, so it may prevent adhesion with the second sidewall forming the sensing cavity, and effectively improve the stability and reliability of the sensing device.

FIG. 1 is a schematic diagram illustrating an exemplary sensing device according to some embodiments of the present disclosure. The sensing device 10 may acquire an external signal and generate a required signal (e.g., an electrical signal) based on the external signal. The external signal may include a mechanical vibration signal, an acoustic signal, an optical signal, an electrical signal, or the like. A type of the sensing device 10 may include, but are not limited to, a pressure sensing device, a vibration sensing device, a tactile sensing device, or the like. In some embodiments, the sensing device 10 may be applied to a mobile device, a wearable device, a virtual reality device, an augmented reality device, or the like, or any combination thereof. In some embodiments, the mobile device may include a smartphone, a tablet, a personal digital assistant (PDA), a game device, a navigation device, or the like, or any combination thereof. In some embodiments, a wearable device may include a smart bracelet, a headphone, a hearing aid, a smart helmet, a smartwatch, an intelligent garment, a smart backpack, a smart accessory, or the like, or any combination thereof. In some embodiments, a virtual reality device and/or an augmented reality device may include a virtual reality helmet, a pair of virtual reality glasses, a virtual reality patch, an augmented reality helmet, a pair of augmented reality glasses, an augmented reality patch, or the like, or any combination thereof. For example, a virtual reality device and/or an augmented reality device may include Google Glass, Oculus Rift, Hololens, Gear VR, or the like.

Figure 2:
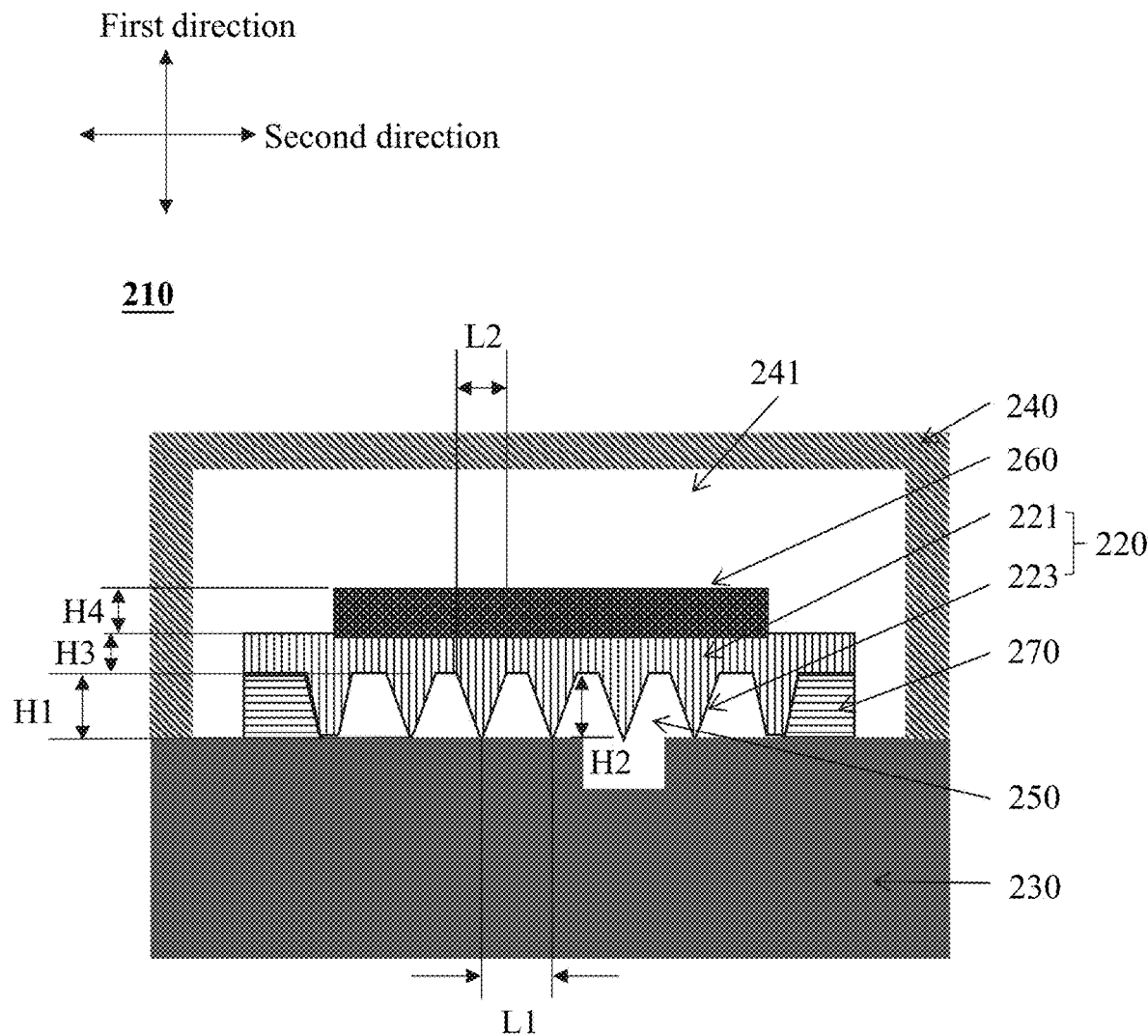
FIG. 2 is a schematic diagram illustrating an exemplary sensing device according to some embodiments of the present disclosure.

As shown in FIG. 1, the sensing device 10 may include an elastic component 20, an energy conversion component 30, a shell 40, and a sensing cavity 50. An interior of the shell 40 may have an accommodation space for accommodating at least one component of the sensing device 10. For example, the shell 40 may accommodate the elastic component 20 and other components (e.g., a mass unit 260 and a sealing unit 270 shown in FIG. 2). In some embodiments, the shell 40 may be connected with other components of the sensing device 10 (e.g., the elastic component 20, convertible components 30, etc.) to form the accommodation space. For example, in the embodiment as shown in FIG. 2, a shell 240 may be connected with an energy conversion component 230 to form an accommodation space 241.

In some embodiments, the shell 40 may be in different shapes. For example, the shell 40 may be arranged as a cube, a cuboid, an approximate cuboid (for example, a structure in which eight corners of the cuboid are replaced by arcs), an ellipsoid, a sphere, or any other shapes.

In some embodiments, the shell 40 may be made of a material with a certain hardness or strength, so that the shell 40 may protect the sensing device 10 and its internal elements (e.g., the elastic component 20). In some embodiments, the materials for making the shell 40 may include but are not limited to, a printed circuit board (PCB) material (such as FR-1 phenolic paper substrate, FR-2 phenolic paper substrate, FR-3 epoxy paper substrate, FR-4 epoxy glass cloth substrate, CEM-1 epoxy glass cloth paper composite board, CEM-3 epoxy glass cloth-glass board, etc.), Acrylonitrile butadiene styrene copolymer (ABS), Polystyrene (PS), High impact polystyrene (HIPS), Polypropylene (PP), Polyethylene terephthalate (PET), Polyester (PES), Polycarbonate (PC), Polyamides (PA), Polyvinyl chloride (PVC), Polyurethanes (PU), Polyvinylidene chloride, Polyethylene (PE), Polymethyl methacrylate (PMMA), Poly-ether-etherketone (PEEK), Phenolics (PF), Urea-formaldehyde (UF), Melamine formaldehyde (MF), metals or alloys (such as aluminum alloys, chromium-molybdenum steels, scandium alloys, magnesium alloys, titanium alloys, magnesium-lithium alloys, nickel alloys, etc.), glass fibers or carbon fibers, or the like, or any combination thereof. In some embodiments, the materials for making the shell 40 may be any combination of glass fibers, carbon fibers, PC, PA, or other materials. In some embodiments, the materials for making the shell 40 may be a mixture of carbon fibers and PC in certain proportions. In some embodiments, the materials for making the shell 40 may be a mixture of carbon fibers, glass fibers, and PC in certain proportions. In some embodiments, the materials for making the shell 40 may be made of glass fibers and PC mixed in certain proportions, or glass fibers and PA mixed in certain proportions.

The sensing cavity 50 may be arranged inside the sensing device 10. The sensing cavity 50 may relate to a sensing signal obtained by the energy conversion component 30. The sensing cavity 50 may be a closed or semi-closed cavity formed by one or more components of the sensing device 10. In some embodiments, the sensing cavity 50 may be a closed or semi-closed cavity formed by the elastic component 20 and other components. For example, the sensing cavity 50 may be a closed cavity formed by the elastic component 20, the energy conversion component 30, and the shell 40. The sensing cavity 50 may have a certain volume, and an interior of the sensing cavity 50 may be filled with gas. The gas may be a gas with stable properties (for example, a gas that is not easy to liquefy, burn or explode). For example, the gas may include air, nitrogen, inert gas, or the like.

When the sensing device 10 works, the volume of the sensing cavity 50 may change. The sensing cavity 50 may include at least two opposite sidewalls. The two opposite sidewalls may include a first sidewall and a second sidewall. When the sensing device 10 works, the first sidewall (or part of structures arranged on the first sidewall) and/or the second sidewall (or part of structures arranged on the second sidewall) of the sensing cavity 50 may have relative displacement(s), resulting in a change in the volume of the sensing cavity 50. In some embodiments, the first sidewall and/or the second sidewall may be composed of one or more components of the sensing device 10. For example, the first sidewall may be composed of the elastic component 20 or one or more elements/units thereof. The second sidewall may be composed of the energy conversion component 30 or one or more elements/units thereof. For example, during the operation of the sensing device 10, the elastic component 20 (or a microstructure, such as at least one convex structure, arranged on a surface (also known as an inner surface) of the elastic component 20 facing toward the sensing cavity 50) forming the first sidewall of the sensing cavity 50 and/or the energy conversion component 30 forming the second sidewall of the sensing cavity 50 may move (for example, as a relative motion due to inconsistent response of the first sidewall and the second sidewall to a vibration) relatively when driven by an external vibration signal, and a distance between inner surfaces of the first sidewall and the second sidewall may change, thereby changing the volume of the sensing cavity 50.

The energy conversion component 30 refers to an element capable of obtaining a sensing signal and converting the sensing signal into a required signal. The sensing signal may include an acoustic signal. In some embodiments, the energy conversion component 30 may convert the sensing signal into an electrical signal. For example, the energy conversion component 30 may convert an acoustic signal (e.g., a sound pressure) into an electrical signal. As another example, the energy conversion component 30 may convert a mechanical vibration signal into an electrical signal. The energy conversion component 30 may be in communication with the sensing cavity 50 and obtain the sensing signal. For example, a surface of the energy conversion component 30 or element/units (e.g., the element used to obtain the sensing signal in the energy conversion component 30) of the energy conversion component 30 may be used as the second sidewall of the sensing cavity 50. The energy conversion component 30 may be in communication with the interior of the sensing cavity 50 and obtain the sensing signal. The sensing signal may relate to one or more parameters of the sensing cavity 50. The one or more parameters may include a cavity height, a volume size, a volume change, an air pressure, or the like. In some embodiments, the sensing signal may relate to a volume change of the sensing cavity 50. Merely by way of example, when the volume of the sensing cavity 50 changes, an air pressure of a gas (e.g., air) filled in the sensing cavity 50 may change. An element used to obtain the sensing signal in the energy conversion component 30 may obtain the air pressure change and generate a corresponding electrical signal. In some embodiments, the energy conversion component 30 may be an acoustic transducer. For example, the energy conversion component 30 may be an air conducting microphone (also known as an air conduction microphone). The air conduction microphone may obtain a sound pressure change of the sensing cavity 50 and convert the sound pressure change into an electrical signal.

The elastic component 20 may vibrate or elastically deform (the elastic component 20 has a certain elasticity) in response to an external signal (e.g., a vibration). As mentioned above, the elastic component 20 may form the first sidewall of the sensing cavity 50. When the elastic component 20 vibrates or elastically deforms, a position of the inner surface of the first sidewall may change. In some embodiments, the position of the second sidewall of the sensing cavity 50 may remain fixed or substantially fixed. At this time, the distance between the inner surface of the first sidewall and the inner surface of the second sidewall may change relatively, and the volume of the sensing cavity 50 may change (assuming that the sidewall between the first sidewall and the second sidewall remains relatively fixed). In some embodiments, the position of the second sidewall of the sensing cavity 50 may also change. For example, both the second sidewall and the first sidewall of the sensing cavity 50 may vibrate. If a vibration phase of the second sidewall is different from a vibration phase of the first sidewall, the distance between the inner surface of the first sidewall and the inner surface of the second sidewall may change relatively, and the volume of the sensing cavity 50 may change (assuming that the sidewall between the first sidewall and the second sidewall remains relatively fixed). As another example, both the second sidewall and the first sidewall of the sensing cavity 50 have elastic deformations. If an elastic deformation of the second sidewall is different from an elastic deformation of the first sidewall, the distance between the inner surface of the first sidewall and the inner surface of the second sidewall may change relatively, and the volume of the sensing cavity 50 may change (assuming that the sidewall between the first sidewall and the second sidewall remains relatively fixed).

Exemplarily, the elastic component 20 and the energy conversion component 30 or elements/units thereof (e.g., elements in the energy conversion component 30 for obtaining the sensing signal) may form the first sidewall and the second sidewall of the sensing cavity 50, respectively. The external signal may be a mechanical vibration. The mechanical vibration may be transmitted to the energy conversion component 30 and the elastic component 20 through the shell 40. In response to the mechanical vibration, both the energy conversion component 30 and the elastic component 20 may vibrate. Due to different vibration phases of the energy conversion component 30 and the elastic component 20, the distance between the inner surfaces of the first sidewall and the second sidewall may change, and the volume of the sensing cavity 50 may change.

In some embodiments, at least one convex structure 23 (e.g., a convex structure 223 shown in FIG. 2) may be arranged on an inner surface (i.e., the surface facing toward the sensing cavity 50) of the elastic component 20. The at least one convex structure 23 may be arranged on at least part of an area on the inner surface of the elastic component 20. In some embodiments, the at least one convex structure 23 may be arranged on the entire inner surface of the elastic component 20. In some embodiments, the at least one convex structure 23 may be arranged on a part of the inner surface of the elastic component 20. In some embodiments, a ratio of an area occupied by the at least one convex structure 23 to the area of the inner surface of the elastic component 20 may be less than three-quarters. In some embodiments, the ratio of an area occupied by the at least one convex structure 23 to the area of the inner surface of the elastic component 20 may be less than two-thirds. In some embodiments, the ratio of an area occupied by the at least one convex structure 23 to the area of the inner surface of the elastic component 20 may be less than one-half. In some embodiments, the ratio of an area occupied by the at least one convex structure 23 to the area of the inner surface of the elastic component 20 may be less than one-third. In some embodiments, the ratio of an area occupied by the at least one convex structure 23 to the area of the inner surface of the elastic component 20 may be less than one-quarter. In some embodiments, the ratio of an area occupied by the at least one convex structure 23 to the area of the inner surface of the elastic component 20 may be less than one-fifth. In some embodiments, the ratio of an area occupied by the at least one convex structure 23 to the area of the inner surface of the elastic component 20 may be less than one-sixth. Exemplary, the inner surface of the elastic component 20 may be divided into a central part and a peripheral part. The at least one convex structure 23 may be arranged on the peripheral part, while the central part may have no convex structure 23. A ratio of an area occupied by the peripheral part to the area of the inner surface of the elastic component 20 may be less than three-quarters, two-thirds, one-half, one-third, one-quarter, one-fifth, one-sixth, or the like.

The at least one convex structure 23 may be arranged on the inner surface of the elastic component 20 uniformly or non-uniformly. In some embodiments, the at least one convex structure 23 may be arranged in an array on the inner surface of the elastic component 20. For example, adjacent convex structures 23 may be spaced on the inner surface of the elastic component 20 at a regular interval. In some embodiments, the distribution of the at least one convex structure 23 on the inner surface of the elastic component 20 may be uneven. For example, an interval between a pair of adjacent convex structures 23 may change with the position of the adjacent convex structures 23.

The at least one convex structure 23 may have a specific shape. In some embodiments, the specific shape may include a regular shape such as a pyramid shape, a hemispherical shape, a stripe shape, a ladder shape, a cylindrical shape, or the like. In some embodiments, the specific shape may be any irregular shape.

For a conventional elastic component that does not include the at least one convex structure 23, which may be used as the first sidewall of the sensing cavity 50, the first sidewall of the sensing cavity 50 may adhere to the second sidewall of the sensing cavity 50 (e.g., the energy conversion component 30) during the vibration due to a large vibration amplitude, resulting in a failure of the sensing device 10. The existence of the at least one convex structure 23 may effectively reduce the contact area between the elastic component 20 and the second sidewall of the sensing cavity 50, thus preventing the adhesion of the first sidewall to the second sidewall of the sensing cavity 50 and improving the stability and reliability of the sensing device 10 effectively.

The at least one convex structure 23 may affect the sensitivity of the sensing device 10. The sensitivity may be an important parameter reflecting the performance of the sensing device 10. The sensitivity may be understood as an amplitude of a response of the sensing device 10 to a specific external signal during operation. For the sensing device 10, the energy conversion component 30 may be in a fluid communication with the sensing cavity 50. The sensing signal obtained by the energy conversion component 30 relates to the volume change of the sensing cavity 50. The sensitivity of the sensing device 10 may relate to a volume size and/or a volume change of the sensing cavity 50. For a same external signal, the greater the volume change of the sensing cavity 50, the greater the response of the sensing device 10 may be, and accordingly, the higher the sensitivity of the sensing device 10 may be; the smaller the volume of the sensing cavity 50 may be, the greater the response of the sensing device 10, and accordingly, the higher the sensitivity of the sensing device 10 may be. Therefore, the sensitivity of the sensing device 10 may vary by changing the volume of the sensing cavity 50 and/or an amount of the change in the volume of the sensing cavity 50 during the operation of the sensing device 10. Since the at least one convex structure 23 protrudes into the interior of the sensing cavity 50 and occupies a part of the volume of the sensing cavity 50, the volume of the sensing cavity 50 is smaller than that when the elastic component 20 of the at least one convex structure 23 is not provided, so that the sensing device 10 may have a higher sensitivity.

In some embodiments, the at least one convex structure 23 may have a certain elasticity. Since the at least one convex structure 23 is elastic, the at least one convex structure 23 may generate elastic deformation when pressed by an external force. In some embodiments, the at least one convex structure 23 may abut against the second sidewall of the sensing cavity 50 (e.g., the surface of the energy conversion component 30 or one or more of its components). When the at least one convex structure 23 abuts against the second sidewall of the sensing cavity 50, the vibration of the elastic component 20 may drive the at least one convex structure 23 to move. At this time, the at least one convex structure 23 may be squeezed by the second sidewall of the sensing cavity 50, resulting in the elastic deformation of the at least one convex structure 23. The elastic deformation may cause the at least one convex structure 23 to protrude further into the sensing cavity 50 and reduce the volume of the sensing cavity 50. Therefore, the volume change of the sensing cavity 50 may be further improved, so as to improve the sensitivity of the sensing device 10. More details about the at least one convex structure and how the at least one convex structure improves the sensitivity of the sensing device may be found elsewhere in the present disclosure. See, for example, FIGS. 2 to 6 and the descriptions thereof, which will not be repeated here.

In some embodiments, the elastic component 20 may include an elastic film 21. The at least one convex structure 23 may be arranged on a surface (i.e., the inner surface) of the elastic film 21 facing toward the sensing cavity 50. In some embodiments, the material for making the elastic film 21 may include polymer materials such as polyimide (PI), polydimethylsiloxane (PDMS), polytetrafluoroethylene (PTFE), or the like. For more details about the elastic film may be found elsewhere in the present disclosure, for example, FIG. 2, FIG. 7, and the descriptions thereof, which will not be repeated here.

The above description of the sensing device 10 is merely a specific example and should not be regarded as the only feasible embodiment. Obviously, for those skilled in the art, after understanding the basic principle of the sensing device 10, various modifications and changes in form and detail may be made to the specific methods and steps of implementing the sensing device 10 without departing from this principle, but these modifications and changes are still within the scope described above. In some embodiments, the sensing device 10 may include one or more other components, such as a mass unit (the mass unit 260 shown in FIG. 2), a sealing unit (the sealing unit 270 shown in FIG. 2), or the like, or any combination thereof. In some embodiments, a plurality of components of the sensing device 10 may be combined into a single component. For example, the mass unit may be integrated on the elastic component 20 to form a resonant system with the elastic component 20. The resonant system vibrates in response to an external signal. In some embodiments, a component of the sensing device 10 may be split into one or more subcomponents. For example, the elastic component 20 may be divided into an elastic film (the elastic film 721 shown in FIG. 7) and an elastic microstructure layer (the elastic microstructure layer 725 shown in FIG. 7). The at least one convex structure 23 may be arranged on the elastic microstructure layer.

FIG. 2 is a schematic diagram illustrating an exemplary sensing device according to some embodiments of the present disclosure. In the present embodiment, the sensing device 210 may be a vibration sensing device. The vibration sensing device may acquire a vibration signal and convert the vibration signal into an electrical signal. For example, the sensing device 210 may be part of a microphone, such as a bone conduction microphone (also known as a bone conduction microphone). The bone conduction microphone may convert a vibration signal into a voice signal. For example, the bone conduction microphone may acquire a vibration signal generated by the facial muscle when a user speaks, and convert the vibration signal into an electrical signal containing voice information.

As shown in FIG. 2, the sensing device 210 may include an elastic component 220, an energy conversion component 230, a shell 240, a mass unit 260, and a sealing unit 270. The shell 240 may have the accommodation space 241 for accommodating one or more components of the sensing device 210 (e.g., the elastic component 220, the mass unit 260, and the sealing unit 270). In some embodiments, the shell 240 may be a semi-closed shell, which may be connected with the energy conversion component 230 to form the accommodation space 241. For example, the shell 240 may be set above and cover the energy conversion component 230 to form the accommodation space 241.

In some embodiments, the sensing device 210 shown in FIG. 2 may be applied to the field of microphones as a vibration sensing device, such as a bone conduction microphone. For example, when applied to a bone conduction microphone, the sensing cavity 250 may also be referred to as an acoustic cavity, and the energy conversion component 230 may be an acoustic transducer. The acoustic transducer may obtain a sound pressure change of the acoustic cavity and convert the sound pressure change of the acoustic cavity into an electrical signal. In some embodiments, the elastic component 220 is arranged above the acoustic transducer (i.e., the energy conversion component 230), and a sensing cavity 250 is formed between the elastic component 220 and the acoustic transducer.

The elastic component 220 may include an elastic film 221. At least one convex structure 223 is arranged on a surface (also known as an inner surface) of the elastic film 221 close to the energy conversion component 230. The at least one convex structure 223 and the elastic film 221 (forming a first sidewall of the sensing cavity 250) may form the sensing cavity 250 together with the energy conversion component 230 (forming a second sidewall of the sensing cavity 250). For a vibration sensing device, the sensing cavity 250 may also be referred to as an acoustic cavity. The elastic film 221 may also be referred to as a diaphragm.

As shown in FIG. 2, an outer edge of the elastic film 221 may be physically connected with the energy conversion component 230. The physical connection may include a bonding connection, a nailing connection, a clamping connection, and a connection through additional connecting components (e.g., the sealing unit 270). For example, the outer edge of the elastic film 221 may be bonded with the energy conversion component 230 by an adhesive to form the sensing cavity 250. However, the sealing performance of the adhesive bonding is poor, which reduces the sensitivity of the sensing device 210 to a certain extent. In some embodiments, the top of the at least one convex structure 223 abuts against the surface of the energy conversion component 230. The top refers to end(s) of the at least one convex structure 223 away from the elastic film 221. A connection between the top of the at least one convex structure 223 arranged on the periphery of the elastic film 221 and the surface of the energy conversion component 230 may be implemented by the sealing unit 270, so that the at least one convex structure 223, the elastic film 221, the sealing unit 270 and the energy conversion component 230 may form a closed sensing cavity 250 together. It can be understood that a position of the sealing unit 270 is not limited to the above descriptions. In some embodiments, the sealing unit 270 may be arranged not only at the connection between the top of the at least one convex structure 223 and the surface of the energy conversion component 230, but also on peripheries (i.e., one side of the at least one convex structure 223 away from the sensing cavity 250) of the at least one convex structure 223 for forming the sensing cavity 250. In some embodiments, in order to further improve the sealing performance, a sealing structure may also be arranged inside the sensing cavity 250. By implementing the connection between the elastic component 220 and the energy conversion component 230 through the sealing unit 270, the sealing performance of the entire sensing cavity 250 may be ensured, and the reliability and stability of the sensing device 210 may be effectively improved. In some embodiments, the sealing unit 270 may be made of silica gels, rubbers, and other materials to further improve the sealing performance of the sealing unit 270. In some embodiments, the type of sealing unit 270 may include one or more of a sealing ring, a sealing gasket, and a sealant strip.

In some embodiments, the elastic film 221 may have a certain thickness, and the thickness of the elastic film 221 refers to a size of the elastic film 221 in the first direction. For the convenience of understanding, the thickness of the elastic film 221 may be represented by H3 in FIG. 2. In some embodiments, the thickness H3 of the elastic film 221 may be within a range of 0.1 μm-500 μm. In some embodiments, the thickness H3 of the elastic film 221 may be within a range of 0.2 μm-400 μm. In some embodiments, the thickness H3 of the elastic film 221 may be within a range of 0.4 μm-350 μm. In some embodiments, the thickness H3 of the elastic film 221 may be within a range of 0.6 μm-300 μm. In some embodiments, the thickness H3 of the elastic film 221 may be within a range of 0.8 μm-250 μm. In some embodiments, the thickness H3 of the elastic film may be within a range of 1 μm-200 μm.

The mass unit 260 may be connected to the elastic component 220, and located on the side of the elastic component 220 away from the sensing cavity 250. For example, the mass unit 260 may be arranged on the elastic film 221, located on the side away from the sensing cavity 250. In response to the vibration of the shell 240 and/or the energy conversion component 230, the mass unit 260 may form a resonant system together with the elastic component 220 to generate vibrations. The mass unit 260 has a certain mass, so that a vibration amplitude of the elastic component 220 relative to the shell 240 may be increased, so that the volume change of the sensing cavity 250 can be significantly changed under the action of external vibrations of different intensities, so as to improve the sensitivity of the sensing device 210.

In some embodiments, the mass unit 260 may have a regular structure such as a cylinder, a cube, a cuboid, or other irregular structure. As shown in FIG. 2, the mass unit 260 may have a cylindrical structure.

In some embodiments, the mass unit 260 may be made of a material with a relatively high density. Exemplarily, the mass unit 260 may be made of copper, iron, stainless steel, lead, tungsten, molybdenum, and other materials. In some embodiments, the mass unit 260 may be made of copper. In some embodiments, the mass unit 260 may be made of some elastic materials. In some embodiments, the mass unit 260 made of the above elastic material may be disposed on the side of the elastic component 220 facing toward the energy conversion component 230. For example, the at least one convex structure 223 may be provided (e.g., by cutting, injection molding, bonding, etc.) directly on the surface of the side of the mass unit 260 facing toward the energy conversion component 230. Since the mass unit 260 is elastic, the at least one convex structure 223 provided on the mass unit 260 may also be elastic. In this embodiment, the mass unit 260 may reduce the volume of the sensing cavity 250 and improve the sensitivity of the sensing device 210 to a certain extent. In some embodiments, the top of the at least one convex structure 223 provided on the mass unit 260 may abut against the surface of the energy conversion component 230.

In some embodiments, Young's modulus of the elastic film 221 and the Young's modulus of the mass unit 260 may have different values for the sensing device 210 of different types and/or sizes. In some embodiments, the value of Young's modulus of the elastic film 221 may be less than 500 MPa. In some embodiments, the value of Young's modulus of the elastic film 221 may be less than 300 MPa. In some embodiments, the value of Young's modulus of the elastic film 221 may be less than 200 MPa. In some embodiments, the value of Young's modulus of the elastic film 221 may be less than 100 MPa. In some embodiments, the value of Young's modulus of the elastic film 221 may be less than 80 MPa. In some embodiments, the value of Young's modulus of the elastic film 221 may be less than 60 MPa. In some embodiments, the value of Young's modulus of the elastic film 221 may be less than 40 MPa. In some embodiments, the value of Young's modulus of the mass unit 260 may be greater than 10 GPa. In some embodiments, the value of Young's modulus of the mass unit 260 may be greater than 50 GPa. In some embodiments, the value of Young's modulus of the mass unit 260 may be greater than 80 GPa. In some embodiments, the value of Young's modulus of the mass unit 260 may be greater than 100 GPa. In some embodiments, the value of Young's modulus of the mass unit 260 may be greater than 200 GPa. In some embodiments, the value of Young's modulus of the mass unit 260 may be greater than 500 GPa. In some embodiments, the value of Young's modulus of the mass unit 260 may be greater than 1000 GPa.

In some embodiments, the mass unit 260 may have a certain thickness. The thickness of the mass unit refers to the size of the mass unit 260 in the first direction. For the convenience of understanding, the thickness of the mass unit 260 may be represented by H4 in FIG. 2. In some embodiments, the thickness H4 of the mass unit 260 is within a range of 1 μm-1000 μm. In some embodiments, the thickness H4 of the mass unit 260 is within a range of 10 μm-900 μm. In some embodiments, the thickness H4 of the mass unit 260 is within a range of 20 μm-800 μm. In some embodiments, the thickness H4 of the mass unit 260 is within a range of 30 μm-700 μm. In some embodiments, the thickness H4 of the mass unit 260 is within a range of 40 μm-600 μm. In some embodiments, the thickness H4 of the mass unit 260 is within a range of 50 μm to 500 μm.

For the sensing device 210 of different types and/or sizes, a ratio or difference between the thickness H4 of the mass unit 260 and the thickness H3 of the elastic film 221 is within a certain range. In some embodiments, the ratio of the thickness H4 of the mass unit 260 to the thickness H3 of the elastic film 221 is within a range of 1-100000. In some embodiments, the ratio of the thickness H4 of the mass unit 260 to the thickness H3 of the elastic film 221 is within a range of 1-50000. In some embodiments, the ratio of the thickness H4 of the mass unit 260 to the thickness H3 of the elastic film 221 is within a range of 10-10000. In some embodiments, the ratio of the thickness H4 of the mass unit 260 to the thickness H3 of the elastic film 221 is within a range of 100-5000. In some embodiments, the ratio of the thickness H4 of the mass unit 260 to the thickness H3 of the elastic film 221 is within a range of 100-1000. In some embodiments, the ratio of the thickness H4 of the mass unit 260 to the thickness H3 of the elastic film 221 is within a range of 100-5000. In some embodiments, the ratio of the thickness H4 of the mass unit 260 to the thickness H3 of the elastic film 221 is within a range of 500-2000.

In some embodiments, the mass unit 260 may be located in the middle part of the elastic component 220 (e.g., the elastic film 221). The middle part refers to the middle part of the elastic component 220 in a second direction. For example, the elastic film 221 may be circular, and the mass unit 260 may have a cylindrical structure. The mass unit 260 may be arranged in the middle part of the elastic film 221. In some embodiments, the distance between the axis of the mass unit 260 and the center point of the elastic film 221 in the second direction may be lower than a threshold distance. The threshold distance may be 50 μm. 0.1 mm, 0.5 mm, 1 mm, 2 mm, etc. In some embodiments, the center point of the elastic film 221 is on the axis of the mass unit 260. By setting the mass unit 260 in the middle of the elastic film 221, the displacement of the mass unit 260 in the second direction may be reduced and the sensitivity of the sensing device 210 may be improved.

As shown in FIG. 2, a projected area of the mass unit 260 in the first direction may be less than a projected area of the elastic component 220 in the first direction. For the sensing device 210 of different types and/or sizes, a ratio of the projected area of the mass unit 260 in the first direction to the projected area of the elastic component 220 in the first direction may be within a certain range. In some embodiments, the ratio of the projected area of the mass unit 260 in the first direction to the projected area of the elastic component 220 in the first direction may be within a range of 0.05-0.95. In some embodiments, the ratio of the projected area of the mass unit 260 in the first direction to the projected area of the elastic component 220 in the first direction may be within a range of 0.1-0.9. In some embodiments, the ratio of the projected area of the mass unit 260 in the first direction to the projected area of the elastic component 220 in the first direction may be within a range of 0.2-0.9. In some embodiments, the ratio of the projected area of the mass unit 260 in the first direction to the projected area of the elastic component 220 in the first direction may be within a range of 0.3-0.8. In some embodiments, the ratio of the projected area of the mass unit 260 in the first direction to the projected area of the elastic component 220 in the first direction may be within a range of 0.4-0.7. In some embodiments, the ratio of the projected area of the mass unit 260 in the first direction to the projected area of the elastic component 220 in the first direction may be within a range of 0.5-0.6.

For the sensing device 210 of different types and/or sizes, a ratio of the projected area of the mass unit 260 in the first direction to a projected area of the sensing cavity 250 in the first direction may be within a certain range. In some embodiments, the ratio of the projected area of the mass unit 260 in the first direction to the projected area of the sensing cavity 250 in the first direction may be within a range of 0.05-0.95. In some embodiments, the ratio of the projected area of the mass unit 260 in the first direction to the projected area of the sensing cavity 250 in the first direction may be within a range of 0.1-0.9. In some embodiments, the ratio of the projected area of the mass unit 260 in the first direction to the projected area of the sensing cavity 250 in the first direction may be within a range of 0.2-0.9. In some embodiments, the ratio of the projected area of the mass unit 260 in the first direction to the projected area of the sensing cavity 250 in the first direction may be within a range of 0.3-0.8. In some embodiments, the ratio of the projected area of the mass unit 260 in the first direction to the projected area of the sensing cavity 250 in the first direction may be within a range of 0.4-0.7. In some embodiments, the ratio of the projected area of the mass unit 260 in the first direction to the projected area of the sensing cavity 250 in the first direction may be within a range of 0.5-0.6.

In the present embodiment, the elastic component 220 (e.g., the elastic film 221) may have a higher elasticity than the shell 240, so that the elastic component 220 may move relative to the shell 240. When an external vibration is applied on the shell 240, the shell 240, the energy conversion component 230, the elastic component 220, and other components may vibrate. Since the vibration phase of the elastic component 220 is different from the vibration phase of the energy conversion component 230, the volume of the sensing cavity 250 (i.e., the acoustic cavity) may be changed, resulting in the change of the sound pressure of the acoustic cavity, which is converted into the electrical signal by the energy conversion component 230 to realize the pickup of a bone conduction sound.

Figure 11:
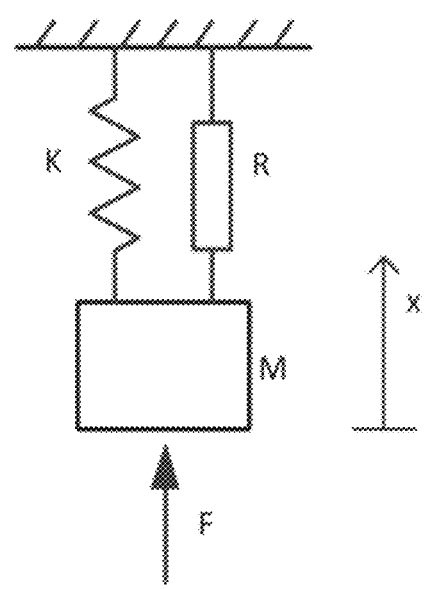
FIG. 11 is a schematic diagram illustrating an exemplary simplified mechanical model of the system composed of an elastic component and a mass unit according to some embodiments of the present disclosure.

For better understanding, the structure composed of the elastic component 220 (including the elastic film 221 and the at least one convex structure 223) and the mass unit 260 may be simplified and equivalent to a model of mass-spring-damping system shown in FIG. 11, in which the elastic component 220 provides the spring and damping effect for the system, and the mass unit 260 provides the mass effect for the system. When the system works, the model of the mass-spring-damping system may be forced to move under the action of exciting force, and the vibration law of the movement conforms to the law of the mass-spring-damping system. Specifically, the motion of the system may be described by a differential equation as Equation (1):

$$M\frac{d^2x}{dt^2} + R\frac{dx}{dt} + Kx = F\cos\omega t \qquad (1)$$

where M denotes the mass of the system, R is the damping of the system, K is the elastic coefficient of the system, F is the amplitude of the driving force, x is the displacement of the system, and ω is the circular frequency of the driving force. By solving a steady-state displacement based on Equation (1):

$$x = x_a \cos(\omega t - \theta) \qquad (2)$$

where $x_a = \frac{F}{w|Z|} = \frac{F}{\omega\sqrt{R^2 + (\omega M - K\omega^{-1})^2}}$.

Further, based on Equation (1) and Equation (2), a displacement amplitude ratio (normalization) equation may be obtained:

$$A = \frac{x_a}{x_{a0}} = \frac{Q_m}{\sqrt{\frac{f^2}{f_0} + \left(\frac{f^2}{f_0} - 1\right)^2 Q_M^2}} \qquad (3)$$

where, f represents the frequency of the system, $f_0$ represents the resonance frequency of the system, $$Q_M = \frac{\omega_0 M}{R},$$

$Q_M$ represents the mechanical quality factor, and $$x_{a0} = \frac{F}{K}$$

represents the static displacement amplitude (or the displacement amplitude at time).

When the mass unit 260 vibrates under excitation of an external vibration signal, the volume of the sensing cavity 250 may be compressed or expanded, and the volume change of the sensing cavity 250 during compression or expansion is ΔV. The sensitivity S of the sensing device 210 may satisfy:

$$S \propto \frac{\Delta V}{V_0},$$

that is, the sensitivity S of the sensing device 210 may be directly proportional to the volume change ΔV of the sensing cavity 250 and inversely proportional to the volume $V_0$ of the sensing cavity 250. Based on the above principle, in some embodiments, the sensitivity of the sensing device 210 may be improved by increasing the volume change ΔV of the sensing cavity 250 and/or reducing the volume $V_0$ of the sensing cavity 250.

In some embodiments, the sensing cavity 250 may be composed of an elastic component 220, the energy conversion component 230, and other components. For example, the sensing cavity 250 may be composed of the elastic component 220, an energy conversion component 230 and a sealing unit 270. In the above embodiment, the elastic component (e.g., the elastic film 221 and the at least one convex structure 223) and the energy conversion component (e.g., the energy conversion component 230) may serve as the first sidewall and the second sidewall of the sensing cavity 250, respectively. Therefore, the structure of the elastic component 220 and the energy conversion component 230 may affect the volume of the sensing cavity 250 of the sensing device 210 and the volume change of the sensing cavity 250 when the sensing device 210 works. For the elastic component 220, since the at least one convex structure 223 is arranged on the inner surface of the elastic film 221, and the at least one convex structure 223 may protrude into the sensing cavity 250, the volume of the sensing cavity 250 may be reduced, so the sensitivity of the sensing device 210 may be improved.

In some embodiments, the volume $V_0$ of the sensing cavity 250 may relate to the density of the at least one convex structure 223 forming the sensing cavity 250. It can be understood that the smaller the interval between a pair of adjacent convex structures 223, the greater the distribution density of the at least one convex structure 223 may be, and the smaller the volume $V_0$ of the sensing cavity 250 composed of the at least one convex structure 223 may be. The interval between a pair of adjacent convex structures 223 refers to the distance between centers of adjacent convex structures 223. The center may be understood as a centroid on a cross-section of the at least one convex structure 223. For the convenience of illustration, the interval between a pair of adjacent convex structures 223 may be represented by L1 of FIG. 2, that is, the distance between the top or center of adjacent convex structures. In some embodiments, the interval L1 between a pair of adjacent convex structures 223 may be within a range of 1 μm-2000 μm. In some embodiments, the interval L1 between a pair of adjacent convex structures 223 may be within a range of 4 μm-1500 μm. In some embodiments, the interval L1 between a pair of adjacent convex structures 223 may be within a range of 8 μm-1000 μm. In some embodiments, the interval L1 between a pair of adjacent convex structures 223 may be within a range of 10 μm-500 μm.

In some embodiments, the volume $V_0$ of the sensing cavity 250 may relate to a width of the at least one convex structure 223. The width of the at least one convex structure 223 may be understood as a size of the at least one convex structure 223 in the second direction. For the convenience of illustration, the size of one convex structure 223 in the second direction may be represented by L2 in FIG. 2. In some embodiments, the width L2 of a single convex structure 223 may be within a range of 1 µm-1000 µm. In some embodiments, the width L2 of a single convex structure 223 may be within a range of 2 µm-800 µm. In some embodiments, the width L2 of a single convex structure 223 may be within a range of 3 µm-600 µm. In some embodiments, the width L2 of a single convex structure 223 may be within a range of 6 µm-400 µm. In some embodiments, the width L2 of a single convex structure 223 may be within a range of 10 µm-300 µm.

For the sensing device 210 of different types and/or sizes, a ratio of the width L2 of the at least one convex structure 223 to the interval L1 between a pair of adjacent convex structures 223 may be within a certain range. In some embodiments, the ratio of the width L2 of the at least one convex structure 223 to the interval L1 between a pair of adjacent convex structures 223 may be within a range of 0.05-20. In some embodiments, the ratio of the width L2 of the at least one convex structure 223 to the interval L1 between a pair of adjacent convex structures 223 may be within a range of 0.1-20. In some embodiments, the ratio of the width L2 of the at least one convex structure 223 to the interval L1 between a pair of adjacent convex structures 223 may be within a range of 0.1-10. In some embodiments, the ratio of the width L2 of the at least one convex structure 223 to the interval L1 between a pair of adjacent convex structures 223 may be within a range of 0.5-8. In some embodiments, the ratio of the width L2 of the at least one convex structure 223 to the interval L1 between a pair of adjacent convex structures 223 may be within a range of 1-6. In some embodiments, the ratio of the width L2 of the at least one convex structure 223 to the interval L1 between a pair of adjacent convex structures 223 may be within a range of 2-4.

In some embodiments, the volume $V_O$ of the sensing cavity 250 may relate to a height H1 of the at least one convex structure 223. The height of the at least one convex structure 223 may be understood as a size in the first direction when the at least one convex structure 223 is in a natural state (for example, when the at least one convex structure 223 is not squeezed to generate elastic deformation). For the convenience of illustration, the size of the at least one convex structure 223 in the first direction may be represented by H1 in FIG. 2. In some embodiments, the height H1 of the at least one convex structure 223 may be within a range of 1 µm-1000 µm. In some embodiments, the height H1 of the at least one convex structure 223 may be within a range of 2 µm-800 µm. In some embodiments, the height H1 of the at least one convex structure 223 may be within a range of 4 µm-600 µm. In some embodiments, the height H1 of the at least one convex structure 223 may be within a range of 6 µm-500 µm. In some embodiments, the height H1 of the at least one convex structure 223 may be within a range of 8 µm-400 µm. In some embodiments, the height H1 of the at least one convex structure 223 may be within a range of 10 µm-300 µm.

In some embodiments, a difference between the height of the sensing cavity 250 and the height of the at least one convex structure 223 may be within a certain range. For example, at least part of the at least one convex structure 223 may not be in contact with the energy conversion component 230. At this time, a certain gap may exist between the at least one convex structure 223 and the surface of the energy conversion component 230. The gap between the at least one convex structure 223 and the surface of the energy conversion component 230 refers to the distance between the top of the at least one convex structure 223 and the surface of the energy conversion component 230. The gap may be formed by the process of fabricating the at least one convex structure 223 or installing the elastic component 220. The height of the sensing cavity 250 may be understood as the size of the sensing cavity 250 in the first direction in a natural state (for example, when the first sidewall and the second sidewall do not vibrate or elastically deform). For ease of illustration, the size of the sensing cavity 250 in the first direction may be represented by H2 in FIG. 2. In some embodiments, a difference between the height H1 of the at least one convex structure 223 and the height H2 of the sensing cavity 250 may be within 20%. In some embodiments, a difference between the height H1 of the at least one convex structure 223 and the height H2 of the sensing cavity 250 may be within 15%. In some embodiments, a difference between the height H1 of the at least one convex structure 223 and the height H2 of the sensing cavity 250 may be within 10%. In some embodiments, a difference between the height H1 of the at least one convex structure 223 and the height H2 of the sensing cavity 250 may be within 5%. In some embodiments, a gap between the at least one convex structure 223 and the surface of the energy conversion component 230 may be within 10 µm. In some embodiments, a gap between the at least one convex structure 223 and the surface of the energy conversion component 230 may be within 5 µm. In some embodiments, a gap between the at least one convex structure 223 and the surface of the energy conversion component 230 may be within 1 µm.

During the operation of the sensing device 210, the elastic component 220 may generate vibration or elastic deformation after receiving an external signal (e.g., a vibration signal), and may drive the at least one convex structure 223 to move in the first direction shown in FIG. 2, so that the sensing cavity 250 may shrink or expand, and the volume change of the sensing cavity 250 may be expressed as $\Delta V1$. Since a motion amplitude of the elastic component 220 and the at least one convex structure 223 in the first direction is small, for example, the motion amplitude of the at least one convex structure 223 in the first direction may be usually less than 1 µm, in the process, the at least one convex structure 223 may not be in contact with the surface of the energy conversion component 230, so $\Delta V1$ may have nothing to do with the at least one convex structure 223, and the value of $\Delta V1$ may be small.

For the sensing device 210 of different types and/or sizes, a ratio or difference between the height H1 of the at least one convex structure 223 and the thickness H3 of the elastic film 221 may be within a certain range. In some embodiments, the ratio of the height H1 of the at least one convex structure 223 to the thickness H3 of the elastic film 221 may be within a range of 0.5-500. In some embodiments, the ratio of the height H1 of the at least one convex structure 223 to the thickness H3 of the elastic film 221 may be within a range of 1-500. In some embodiments, the ratio of the height H1 of the at least one convex structure 223 to the thickness H3 of the elastic film 221 may be within a range of 1-200. In some embodiments, the ratio of the height H1 of the at least one convex structure 223 to the thickness H3 of the elastic film 221 may be within a range of 1-100. In some embodiments, the ratio of the height H1 of the at least one convex structure 223 to the thickness H3 of the elastic film 221 may be within a range of 10-90. In some embodiments, the ratio of the height H1 of the at least one convex structure 223 to the thickness H3 of the elastic film 221 may be within a range of 20-80. In some embodiments, the ratio of the height H1 of the at least one convex structure 223 to the thickness H3 of the elastic film 221 may be within a range of 40-60.

Figure 3A:
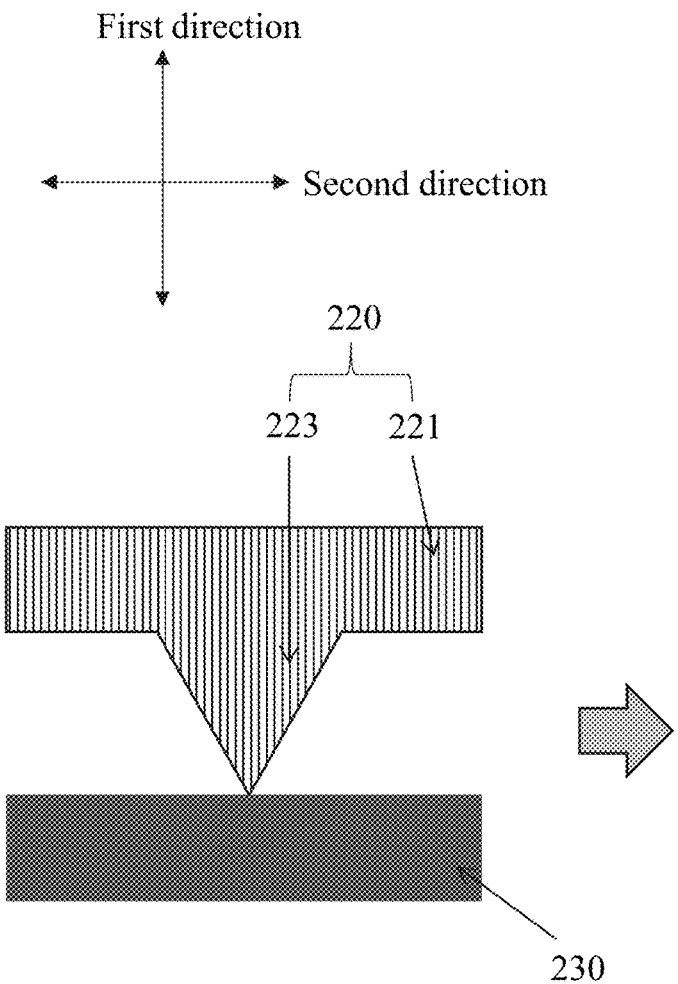
FIG. 3A is a schematic diagram illustrating an exemplary section of a convex structure abutting against a second sidewall of a sensing cavity according to some embodiments of the present disclosure.
Figure 3B:
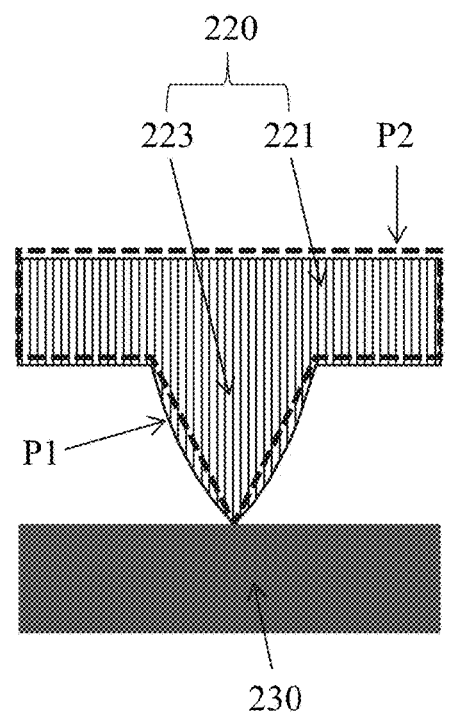
FIG. 3B is another schematic diagram illustrating an exemplary section of the at least one convex structure abutting against the second sidewall of the sensing cavity according to some embodiments of the present disclosure.

In some embodiments, the at least one convex structure 223 may be directly contacted with the surface of the energy conversion component 230. At this time, the height H1 of the at least one convex structure 223 is the same as or similar to the height H2 of the sensing cavity 250. FIG. 3A is a schematic diagram illustrating an exemplary section of the at least one convex structure abutting against the second sidewall of the sensing cavity according to some embodiments of the present disclosure; FIG. 3B is another schematic diagram illustrating an exemplary section of the at least one convex structure abutting against the second sidewall of the sensing cavity according to some embodiments of the present disclosure; As shown in FIG. 3 A, the at least one convex structure 223 may abut against the second sidewall of the sensing cavity 250. The at least one convex structure 223 may have certain elasticity. In this embodiment, when the elastic component 220 is motivated by external forces and moves, the elastic component 220 may drive the at least one convex structure 223 to move in the direction of the energy conversion component 230. The elastic component 220 and the at least one convex structure 223 may reduce the volume of the sensing cavity 250, and the volume of the sensing cavity 250 may be expressed as a variable volume $\Delta V1$. In addition, because the at least one convex structure 223 may abut against the energy conversion component 230, the at least one convex structure 223 may be squeezed by the energy conversion component 230 under the action of external forces. Because the at least one convex structure 223 may have certain elasticity, the force generated by the squeezing may cause the flexible deformation of the at least one convex structure 223. The at least one convex structure 223 may further reduce the volume of the sensing cavity 250 when the elastic deformation occurs. FIG. 3B shows the amplitude of the movement of the at least one convex structure 223 in the first direction and the elastic deformation generated. The solid line P1 shows the outline and position of the at least one convex structure 223 after squeezing. The dotted line P2 shows the outline and position of the at least one convex structure 223 before squeezing. It can be seen from the figure that due to the elastic deformation of the at least one convex structure 223, the volume of the sensing cavity 250 may be further reduced. For the convenience of description, a value of the volume change of the sensing cavity 250 caused by the second sidewall of the sensing cavity 250 squeezing the at least one convex structure 223 may be represented as $\Delta V2$. Based on the above content, if the at least one convex structure 223 abuts against the second sidewall of the sensing cavity 250, the volume change $\Delta V$ of the sensing cavity 250 may be the sum of $\Delta V1$ and $\Delta V2$ during the operation of the sensing device 210. Therefore, the volume change $\Delta V$ of the sensing cavity 250 may be greater than $\Delta V1$, which may further improve the sensitivity of the sensing device 210. In addition, due to the deformation of the at least one convex structure 223, compared with the natural state, the size of the at least one convex structure 223 in the first direction becomes smaller, so the height H2 of the sensing cavity 250 may be smaller than the size of the at least one convex structure 223 in the natural state (i.e., H1).

In some embodiments, the volume change $\Delta V2$ of the sensing cavity 250 may relate to materials of the at least one convex structure 223. The at least one convex structure 223 may be made of materials with certain characteristics. For example, the at least one convex structure 223 may have a specific value of Young's modulus. In some embodiments, the value of Young's modulus of the at least one convex structure 223 is 10 kpa-10 mpa. In some embodiments, the value of Young's modulus of the at least one convex structure 223 is 20 KPa-8 MPa. In some embodiments, the value of Young's modulus of the at least one convex structure 223 is 50 kPa-5 MPa. In some embodiments, the value of Young's modulus of the at least one convex structure 223 is 80 kPa-2 MPa. In some embodiments, the value of Young's modulus of the at least one convex structure 223 is 100 kPa-1 MPa. For the sensing device 210 of different types and/or sizes, the ratio or difference between the Young's modulus of the at least one convex structure 223 and the Young's modulus of the elastic film 221 may be within a certain range. In some embodiments, the ratio of the Young's modulus of the at least one convex structure 223 to the Young's modulus of the elastic film 221 may be within a range of 0.005-1. In some embodiments, the ratio of the Young's modulus of the at least one convex structure 223 to the Young's modulus of the elastic film 221 may be within a range of 0.01-1. In some embodiments, the ratio of the Young's modulus of the at least one convex structure 223 to the Young's modulus of the elastic film 221 may be within a range of 0.05-0.8. In some embodiments, the ratio of the Young's modulus of the at least one convex structure 223 to the Young's modulus of the elastic film 221 may be within a range of 0.1-0.6. In some embodiments, the ratio of the Young's modulus of the at least one convex structure 223 to the Young's modulus of the elastic film 221 may be within a range of 0.2-0.4.

In some embodiments, the materials for making the at least one convex structure 223 may include one or more of silica gels, silicone gels, silicone rubbers, PDMS, and styrene butadiene styrene block copolymers (SBS), so as to ensure that the at least one convex structure 223 may have high elasticity and greater elastic deformation when subjected to the same external force, so the volume change $\Delta V2$ of the sensing cavity 250 may be greater.

Figure 4:
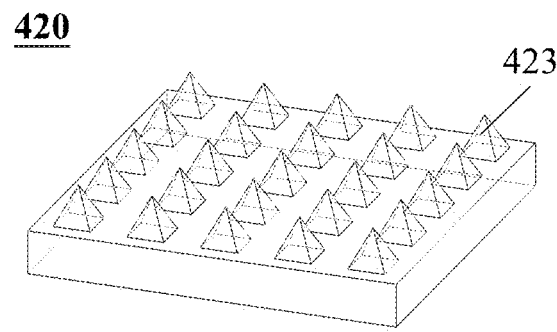
FIG. 4 is a structural schematic diagram illustrating at least one convex structure according to some embodiments of the present disclosure.
Figure 5:
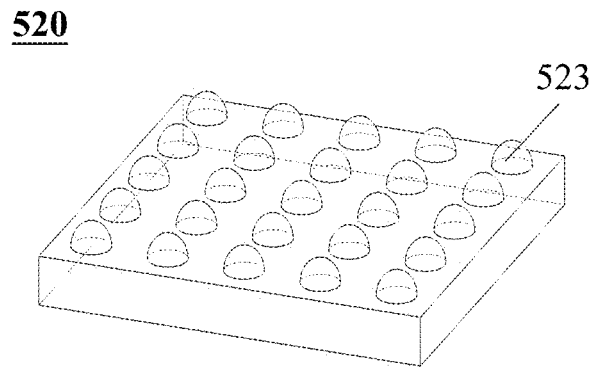
FIG. 5 is a structural schematic diagram illustrating at least one convex structure according to some other embodiments of the present disclosure.
Figure 6:
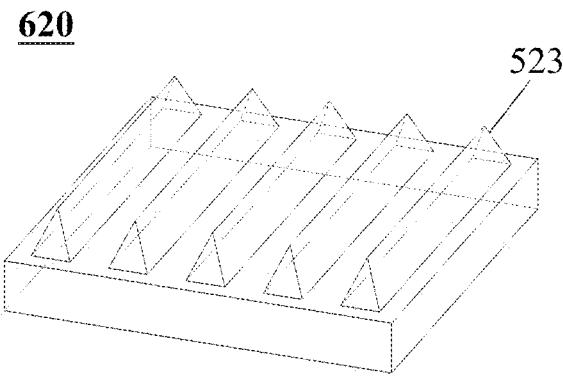
FIG. 6 is a structural schematic diagram illustrating at least one convex structure according to yet other embodiments of the present disclosure.

In some embodiments, the volume change $\Delta V2$ of the sensing cavity 250 may also relate to shapes of the at least one convex structure 223. In some embodiments, the shapes of the at least one convex structure 223 may be various shapes. FIGS. 4 to 6 shows three different shapes of at least one convex structure respectively. The at least one convex structure 423 in FIG. 4 has the shape of a pyramid, which is distributed on the inner surface of an elastic component 420 in the form of a dot array. The shape of the at least one convex structure 523 in FIG. 5 is a hemispherical shape, which is distributed on the inner surface of an elastic component 520 in the form of a dot array. The shape of the at least one convex structure 623 in FIG. 6 is a stripe shape, which is distributed on the inner surface of an elastic component 620 in the form of a line array. It is understood that this is only for the purpose of the explanation, and it does not aim to limit the shape of the at least one convex structure 223. The convex structure 223 may also have other possible shapes. For example, a ladder shaped, a cylindrical, an ellipsoidal, etc.

With reference to FIG. 4, the shape of the at least one convex structure 223 is pyramid-shaped, compared with other shapes (for example, hemispherical), when the at least one convex structure 223 is affected by external forces, the pyramid-shaped convex structure 223 may cause stress concentration at the top. For the different shapes of at least one convex structure 223, if their Yang's modulus is the same, the equivalent stiffness of the pyramid-shaped convex structure 223 may be lower, the elasticity factor may be lower, and the elastic deformation may be greater, which may make the volume change ΔV2 of the sensing cavity 50 greater, and the sensitivity amplification of sensing device 210 greater.

In some embodiments, the sensitivity of the sensing device 210 relates to the resonance frequency $\omega_0$ (i.e., the $f_0$ of the Equation (3)) of the system composed of the mass unit 260 and the elastic component 220. Specifically, $$\omega_0 \propto \sqrt{\frac{K}{M}},$$

when the $$\frac{K}{M}$$

is reduced, the sound pressure variation Δp of the sensing cavity 250 of the sensing device 210 may become larger, and the system's resonance frequency may be reduced. The resonance frequency $\omega_0$ may affect the sensitivity of the sensing device 210 within a certain frequency range before and after the resonance frequency. Therefore, in the process of adjusting the sensitivity of the sensing device 210 by adjusting the resonance frequency of the sensing device 210, the influence of a frequency range on the sensitivity of the sensing device 210 may need to be considered. In some embodiments, the resonance frequency of the sensing device 210 may be within a range of 1500 Hz to 6000 Hz. In some embodiments, the resonance frequency of the sensing device 210 may be within a range of 1500 Hz-5000 Hz. In some embodiments, the resonance frequency of the sensing device 210 may be within a range of 1500 Hz-4000 Hz. In some embodiments, the resonance frequency of the sensing device 210 may be within a range of 1500 Hz-3000 Hz.

Figure 7:
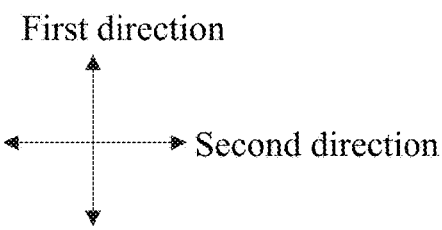
FIG. 7 is a schematic diagram illustrating an exemplary sensing device according to some other embodiments of the present disclosure.
Figure 7:
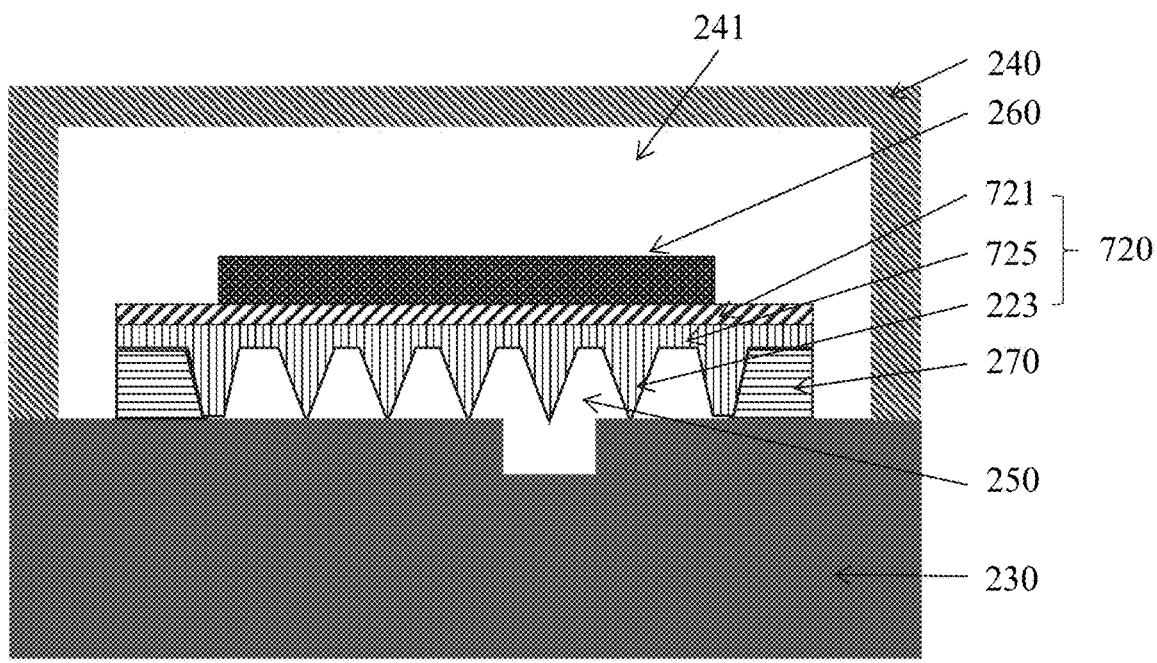

FIG. 7 is a schematic diagram illustrating an exemplary sensing device according to some other embodiments of the present disclosure. Similar to the sensing device 210, the sensing device 710 may include an energy conversion component 230, a shell 240, a sensing cavity 250, a mass unit 260, a sealing unit 270, and an elastic component 720. The shell 240 may cover the energy conversion component 230 to form the accommodation space 241. The elastic component 720, the mass unit 260, and the sealing unit 270 may be accommodated in the accommodation space 241. An outer edge of the elastic component 720 may be fixedly connected with the energy conversion component 230 through the sealing unit 270. The elastic component 720, the energy conversion component 230 and the sealing unit 270 may together form the sensing cavity 250. The mass unit 260 may be arranged on a side of the elastic component 720 away from the sensing cavity 250 to increase a vibration amplitude of the elastic component 720.

In some embodiments, the sensing device 710 shown in FIG. 7 may be applied to the field of microphones as a vibration sensing device, such as a bone conduction microphone. For example, when applied to a bone conduction microphone, the sensing cavity 250 may also be referred to as an acoustic cavity, and the energy conversion component 230 may be an acoustic transducer. The acoustic transducer may obtain a sound pressure change of the acoustic cavity and convert the sound pressure change of the acoustic cavity into an electrical signal.

Unlike the sensing device 210 shown in FIG. 2, in the sensing device 710 shown in FIG. 7, the elastic component 720 may include an elastic film 721 and an elastic microstructure layer 725. One side of the elastic microstructure layer 725 may be connected with the elastic film 721, and the surface of another side may be provided with the at least one convex structure 223. For example, the at least one convex structure 223 may be fabricated in two ways. Method (1) is to etch a groove on a silicon wafer, and a shape of the groove may correspond to the shape of the at least one convex structure 223 to be made. Then, the material (e.g., PDMS) for making the at least one convex structure 223 may be coated on the silicon wafer. The PDMS may fill the groove of the silicon wafer and form a PDMS film on a surface of the silicon wafer. Then, before the PDMS in the groove and the PDMS film on the surface of the silicon wafer are cured, the material for making the elastic film 721, such as PI, may be coated on the surface of the PDMS film. Finally, the PDMS film, the elastic film 721 and the at least one convex structure 223 may be taken out after curing. Method (2) is also etching a groove on the silicon wafer. Then, the material (e.g., PDMS) for making the at least one convex structure 223 may be coated on the silicon wafer. After the PDMS in the groove and the PDMS film on the surface of the silicon wafer are cured, the material (e.g., PI) for making the elastic film 721 may be coated on the surface of the PDMS film or glue may be added before coating. Finally, wait for the elastic film 721 to cure and take it out. The at least one convex structure 223 and the elastic film 721 fabricated by above two methods may contain a layer of PDMS film, which may be the elastic microstructure layer 725.

In some embodiments, the elastic microstructure layer 725 may be made of the same material as the elastic film 721. For example, both the elastic microstructure layer 725 and the elastic film 721 may be made of PDMS. Specifically, when fabricating the at least one convex structure 223, a PDMS film may be coated on the surface of the PDMS film (i.e., the elastic microstructure layer 725) as the elastic film 721. In some embodiments, the elastic microstructure layer 725 may be made of the different material from the elastic film 721. For example, the elastic microstructure layer 725 may be made of PDMS, while the elastic film 721 may be made of PI. As another example, the elastic microstructure layer 725 may be made of PDMS, and the elastic film 721 may be made of PTFE.

In some embodiments, a thickness of the elastic film 721 may be the same as or different from the thickness of the elastic film 221 in the foregoing embodiment. The thickness of the elastic microstructure layer 725 refers to a size of the elastic microstructure layer 725 in the first direction, which may be represented by H5 in FIG. 7. In some embodiments, the thickness H5 of the elastic microstructure layer 725 may be within a range of 1 μm-1000 μm. In some embodiments, the thickness H5 of the elastic microstructure layer 725 may be within a range of 10 μm-200 μm. In some embodiments, the thickness H5 of the elastic microstructure layer 725 may be within a range of 20 μm-100 μm.

In some embodiments, comparing the sensing device 210 of different types and/or sizes, a ratio of the thickness H5 of the elastic microstructure layer 725 to the thickness of the elastic component 720 (i.e., a sum of H5 and H3) may be within a range of 0.5-1. In some embodiments, the ratio of the thickness H5 of the elastic microstructure layer 725 to the thickness of the elastic component 720 may be within a range of 0.8-1. In some embodiments, the ratio of the thickness H5 of the elastic microstructure layer 725 to the thickness of the elastic component 720 may be within a range of 0.9-1.

Figure 8:
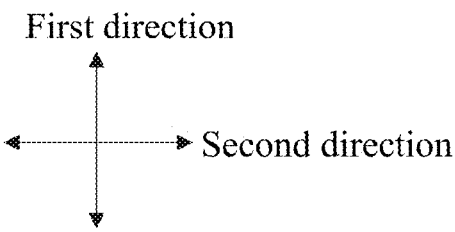
FIG. 8 is a schematic diagram illustrating an exemplary sensing device according to some embodiments of the present disclosure.
Figure 8:
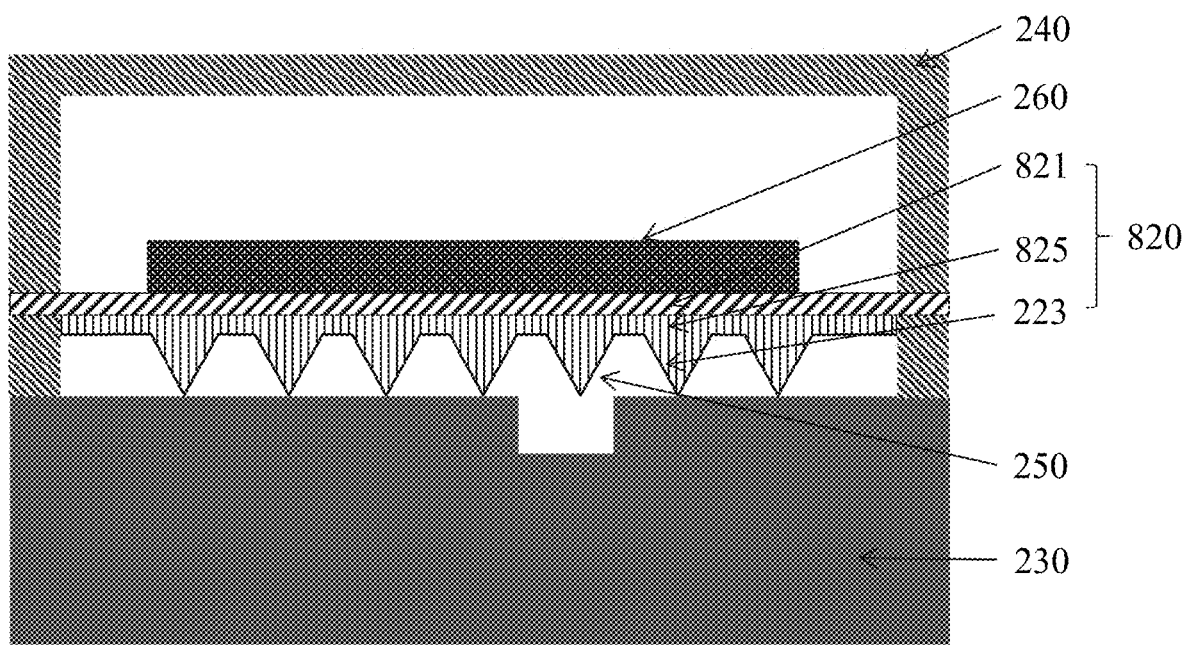

FIG. 8 is a schematic diagram illustrating an exemplary sensing device according to some embodiments of the present disclosure. As shown in FIG. 8, the sensing device 810 may include the energy conversion component 230, the shell 240, the sensing cavity 250, the mass unit 260, and an elastic component 820. In some embodiments, except for the different sealing methods of the sensing cavity 250, the sensing device 810 shown in FIG. 8 may be similar to the sensing device 710 shown in FIG. 7. An outer edge of the elastic component 820 of the sensing device 810 may be directly and fixedly connected with the shell 240, and then the sensing cavity 250 may be formed by the energy conversion component 230, the shell 240 and the elastic component 820. In some embodiments, the elastic component 820 may include an elastic film 821 and an elastic microstructure layer 825. The at least one convex structure 223 may be part of the elastic microstructure layer 825. The elastic microstructure layer 825 may be connected with the elastic film 821 on a side away from the sensing cavity 250. One side of the elastic microstructure layer 825 close to the sensing cavity 250 may be arranged on the at least one convex structure 223. The elastic film 821 and/or the elastic microstructure layer 825 may be directly connected with the shell 240, and the connection method may include a bonding connection, a clamping connection, a riveting connection, and a nailing connection, etc. For example, as shown in FIG. 8, an edge of the elastic film 821 may be directly embedded in a sidewall of the shell 240, the elastic microstructure layer 825 may be close to an inner wall of the shell 240 to ensure the sealing performance of the sensing cavity 250. In the embodiment, the elastic component 820 may be directly connected with the shell 240. On the one hand, a connection of the elastic component 820 with the shell 240 can ensure that the sensing cavity 250 has good sealing performance. On the other hand, the connection of the elastic component 820 with the shell 240 can eliminate the sealing unit, simplify a structure of the sensing device 810, and simplify a manufacturing process of the sensing device 810.

In some embodiments, when the elastic component 820 is directly connected to the shell 240, the projected area of the mass unit 260 in the first direction is less than the projected area of the sensing cavity 250 in the first direction. Specifically, if the elastic component 820 (for example, the elastic film 821 and the elastic microstructure layer 825 of the elastic component 820) are directly and fixedly connected with the shell 240, the projection area of the sensing cavity 250 in the first direction may need to be greater than the projection area of the mass unit 260 in the first direction, so that an edge of the mass unit 260 may have a certain gap with the shell 240, and the mass unit 260 may vibrate in the first direction. In some embodiments, the ratio of the projected area of the mass unit 260 in the first direction to the projected area of the sensing cavity 250 in the first direction may be within a range of 0.05-0.95. In some embodiments, the ratio of the projected area of the mass unit 260 in the first direction to the projected area of the sensing cavity 250 in the first direction may be within a range of 0.1-0.9. In some embodiments, the ratio of the projected area of the mass unit 260 in the first direction to the projected area of the sensing cavity 250 in the first direction may be within a range of 0.2-0.9. In some embodiments, the ratio of the projected area of the mass unit 260 in the first direction to the projected area of the sensing cavity 250 in the first direction may be within a range of 0.3-0.8. In some embodiments, the ratio of the projected area of the mass unit 260 in the first direction to the projected area of the sensing cavity 250 in the first direction may be within a range of 0.4-0.7. In some embodiments, the ratio of the projected area of the mass unit 260 in the first direction to the projected area of the sensing cavity 250 in the first direction may be within a range of 0.5-0.6.

Figure 9:
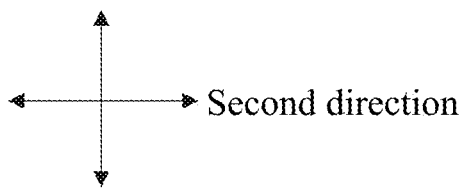
FIG. 9 is a schematic diagram illustrating an exemplary sensing device according to some embodiments of the present disclosure.
Figure 9:
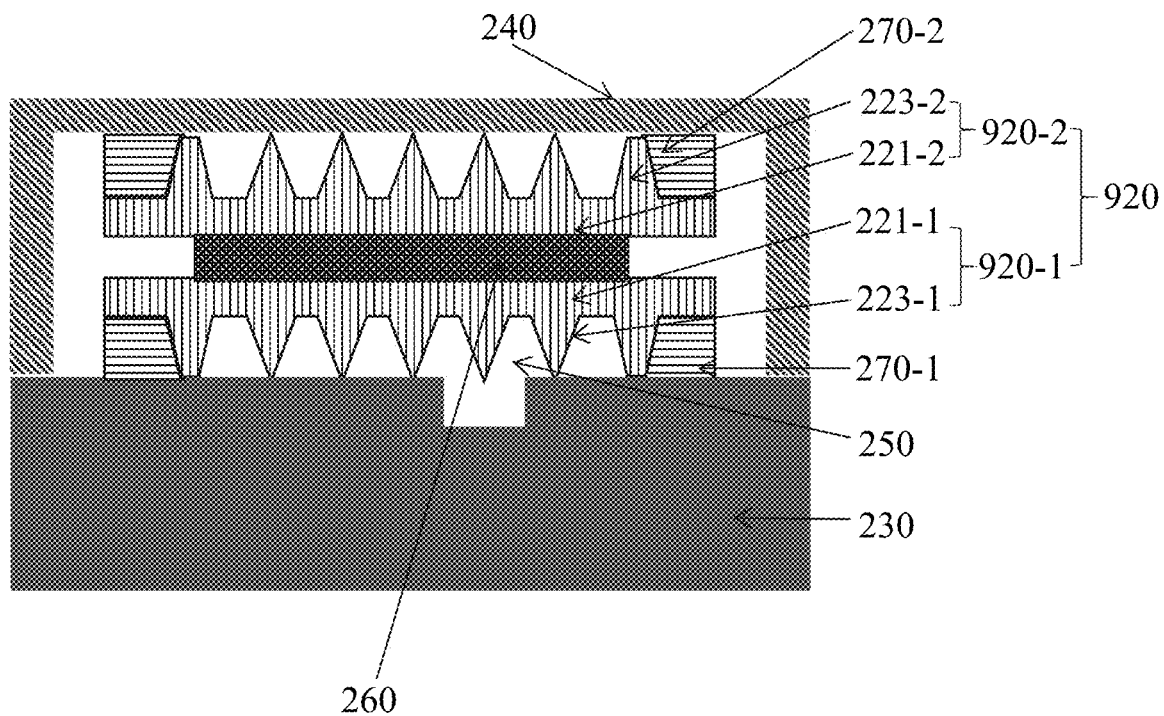

FIG. 9 is a schematic diagram illustrating an exemplary sensing device according to some embodiments of the present disclosure. A sensing device 910 shown in FIG. 9 is similar to the sensing device 210 shown in FIG. 2, except that an elastic component 920 of the sensing device 910 may include a first elastic component 920-1 and a second elastic component 920-2. The first elastic component 920-1 and the second elastic component 920-2 may be respectively disposed on both sides of the mass unit 260 in the first direction, respectively. The first elastic component 920-1 may be located on the side of the mass unit 260 close to the energy conversion component 230, and the second elastic component 920-2 may be located on the side of the mass unit 260 away from the energy conversion component 230. Similar to the elastic component 220 shown in FIG. 2, the first elastic component 920-1 may include a first elastic film 221-1 and at least one first convex structure 223-1 arranged on the surface (also known as the inner surface) of the first elastic film 221-1 facing toward the sensing cavity 250. The edge of the at least one first convex structure 223-1 may be hermetically connected with the energy conversion component 230 through a first sealing unit 270-1, so that the first elastic film 221-1, the at least one first convex structure 223-1, the first sealing unit 270-1 and the energy conversion component 230 may jointly form the sensing cavity 250. The second elastic component 920-2 may include a second elastic film 221-2 and at least one convex second structure 223-2 arranged on the side of the second elastic film 221-2 away from the sensing cavity 250. The edge of the at least one convex second structure 223-2 may be hermetically connected with a top wall (i.e., the side of the shell 240 away from the energy conversion component 230) of the shell 240 through second sealing unit 270-2.

In some embodiments, at least one of the first elastic component 920-1 and the second elastic component 920-2 may include an elastic microstructure layer (not shown in the figure). Taking the first elastic component 920-1 as an example, the first elastic component 920-1 may include the first elastic film 221-1 and a first elastic microstructure layer, which may be arranged on the side of the first elastic film 221-1 facing toward the energy conversion component 230. The side of the first elastic microstructure layer facing toward the energy conversion component 230 may include at least one first convex structure 223-1. The at least one first convex structure 223-1 may be part of the first elastic microstructure layer. The elastic microstructure layer may be the same as or similar to the elastic microstructure layer (e.g., the elastic microstructure layer 725 shown in FIG. 7) in one or more of the foregoing embodiments, which will not be repeated here.

As shown in FIG. 9, the first elastic component 920-1 and the second elastic component 920-2 are distributed on opposite sides of the mass unit 260 in the first direction. The first elastic component 920-1 and the second elastic component 920-2 may be approximately regarded as an elastic component 920. For the convenience of description, the elastic component 920 formed by the first elastic component 920-1 and the second elastic component 920-2 as a whole may be referred to as the third elastic component. A centroid of the third elastic component may coincide or approximately coincide with the center of gravity of the mass unit 260, and the second elastic component 920-2 may be hermetically connected with the top wall (i.e., the side of the shell 240 away from the energy conversion component 230)

of the shell 240, so that within a target frequency range (e.g., below 3000 Hz), a response sensitivity of the third elastic component to the vibration of the shell 240 in the first direction may be higher than a response sensitivity of the third elastic component to the vibration of the shell 240 in the second direction.

In some embodiments, the third elastic component (i.e., the elastic component 920) may generate vibration in the first direction in response to the vibration of the shell 240. The vibration in the first direction may be regarded as a target signal picked up by the sensing device 910 (e.g., the vibration sensing device), and the vibration in the second direction may be regarded as a noise signal. During the operation of the sensing device 910, the response sensitivity of the third elastic component to the vibration of the shell 240 in the second direction may be reduced by reducing the vibration generated by the third elastic component in the second direction, so as to improve the direction selectivity of the sensing device 910 and reduce the interference of the noise signal to a sound signal.

In some embodiments, when the third elastic component vibrates in response to the vibration of the shell 240, if the centroid of the third elastic component coincides or approximately coincides with the center of gravity of the mass unit 260, and the second elastic component 920-2 is hermetically connected with the top wall (i.e., the side of the shell 240 away from the energy conversion component 230) of the shell 240, it may be realized on the premise that the response sensitivity of the third elastic component to the vibration of the shell 240 in the first direction is basically unchanged, the vibration of the mass unit 260 in the second direction may be reduced, so as to reduce the response sensitivity of the third elastic component to the vibration of the shell 240 in the second direction, and then improve the direction selectivity of the sensing device 910. It should be noted that the centroid of the third elastic component approximately coincides with the center of gravity of the mass unit 260, which may be understood as that the third elastic component is a regular geometric structure with uniform density, so the centroid of the third elastic component approximately coincides with its center of gravity. The center of gravity of the third elastic component may be regarded as the center of gravity of the mass unit 260. At this time, the centroid of the third elastic component may be regarded as approximately coincides with the center of gravity of the mass unit 260. In some embodiments, when the third elastic component is an irregular structure or the density is uneven, it may be regarded as that the actual center of gravity of the third elastic component approximately coincides with the center of gravity of the mass unit 260. Approximate coincidence may mean that the distance between the actual center of gravity of the third elastic component or the centroid of the third elastic component and the center of gravity of the mass unit 260 is within a certain range, for example, less than 100 μm, less than 500 μm, less than 1 mm, less than 2 mm, less than 3 mm, less than 5 mm, less than 10 mm, etc.

When the centroid of the third elastic component coincides or approximately coincides with the center of gravity of the mass unit 260, the resonance frequency of the third elastic component vibrating in the second direction may be shifted to high frequency without changing the resonance frequency of the third elastic component vibrating in the first direction. The resonance frequency of the third elastic component vibrating in the first direction may basically remain unchanged, for example, the resonance frequency of the third elastic component vibrating in the first direction may be a frequency within a frequency range (e.g., 20 Hz-2000 Hz, 2000 Hz-3000 Hz, etc.) that can be easily perceived by the human ear. The resonance frequency of the third elastic component vibrating in the second direction may be shifted to a high frequency and located in a frequency range (for example, 5000 Hz-9000 Hz, 1 kHz-14 kHz, etc.) in which the human ear perception is relatively weak.

Figure 10:
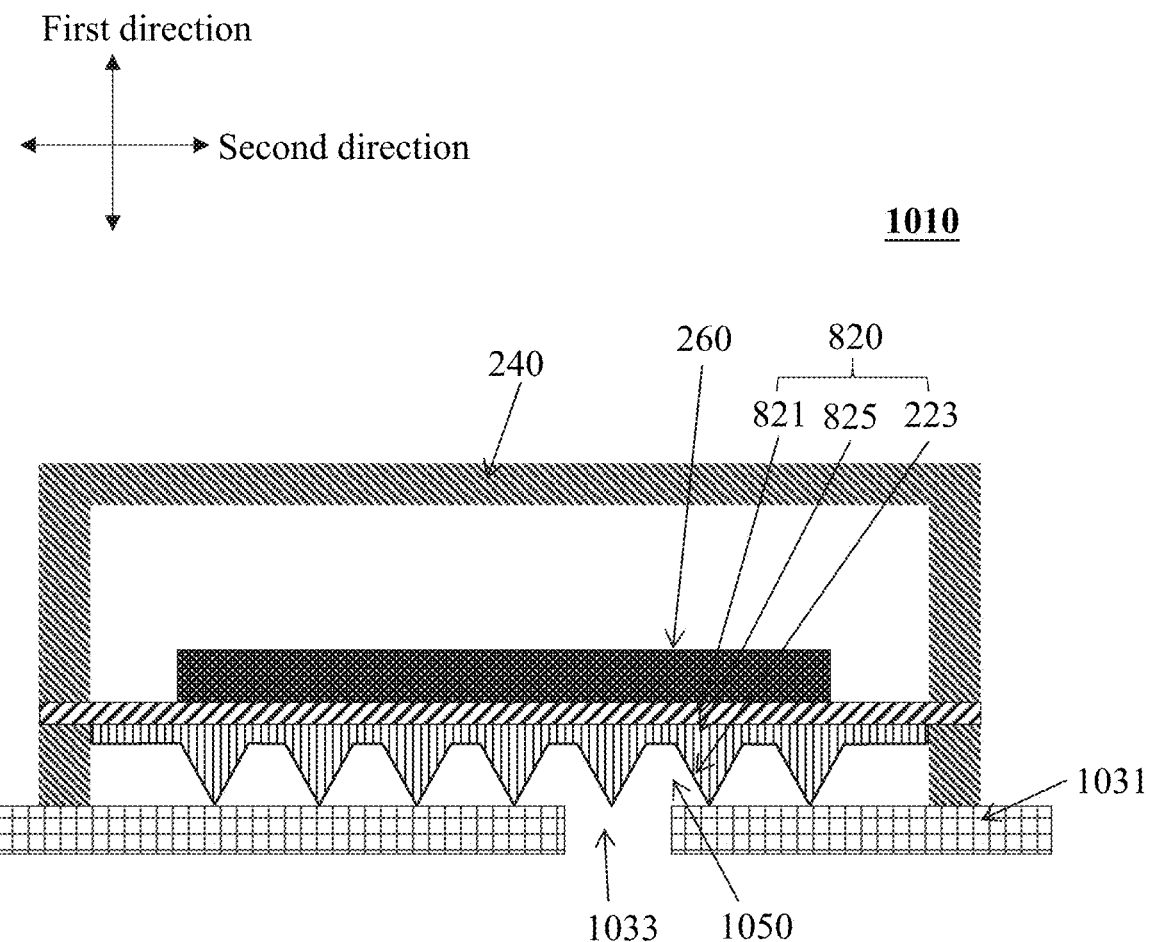
FIG. 10 is a schematic diagram illustrating an exemplary connection between a sensing element and a shell according to some embodiments of the present disclosure.

FIG. 10 is a schematic diagram illustrating an exemplary connection between a sensing element and a shell according to some embodiments of the present disclosure. The sensing element 1010 may be an independent component. The sensing element 1010 may form a high-sensitivity sensing device (e.g., the sensing device 10, the sensing device 210) by assembling with (e.g., by gluing or bonding, or by other detachable means) a specific type of energy conversion component (not shown in the figure). The specific type of energy conversion component may generate a required signal e.g., an electrical signal) in response to a change in the volume of the first sensing cavity 1050. The specific type of energy conversion component may include, for example, an acoustic energy conversion component, such as an air conduction microphone.

As shown in FIG. 10, the sensing element 1010 may include the shell 240, the mass unit 260, a first sensing cavity 1050, and the elastic component 820. The elastic component 820, the mass unit 260, and the shell 240 shown in FIG. 10 may be the same or similar to the corresponding components or units of the sensing device 810 shown in FIG. 8, which will not be repeated here. The elastic component 820 may be used as the first sidewall of the first sensing cavity 1050 to form the first sensing cavity 1050 together with the shell 240. The first sensing cavity 1050 may be a semi-closed structure. In addition, the first sensing cavity 1050 of the sensing element 1010 may be not closed, so dust and impurities may enter the first sensing cavity 1050 during transportation and installation, affecting the performance of the sensing element 1010. Therefore, in some embodiments, a dust-proof structure may be provided at an opening of the unclosed sensing element 1010, that is, the opening side of the first sensing cavity 1050. An exemplary dust-proof structure may include a dust-proof film, a dust-proof cover, or the like.

As an independent component, the sensing element 1010 may be connected with the specific type of energy conversion component to form a sensing device (e.g., the sensing device 10, the sensing device 210). For example, the sensing element 1010 may be fitted with an energy conversion component (e.g., including an acoustic transducer), and the energy conversion component may be placed relative to the elastic component 820 to form a closed sensing cavity. The energy conversion component may convert the volume change of the closed sensing cavity into the electrical signal. In some embodiments, the energy conversion component may be connected to a connecting board 1031. For example, the energy conversion component may be connected on the side of the connecting board 1031 away from the sensing element 1010. The connecting board 1031 may be a printed circuit board (PCB), for example, a phenolic PCB paper substrate, a composite PCB substrate, a glass fiber PCB substrate, a metal PCB substrate, a build-up multilayer PCB substrate, etc. In some embodiments, the connecting board 1031 may be an FR-4 grade glass fiber PCB substrate made of epoxy glass fiber cloth. In some embodiments, the connecting board 1031 may also be a flexible printed circuit board (FPC). The connecting board 1031 may be provided (for example, by means of laser etching, chemical etching, embedding, etc.) with circuits and other components, such as processors, memories, etc. In some embodiments, the energy conversion component may be fixedly connected to the connecting board 1031 through a fixing glue or a metal lead frame. In some embodiments, the fixing glue may be a conductive adhesive (e.g., a silver conductive adhesive, a cupric powder conductive adhesive, a nickel carbon conductive adhesive, a silver-copper conductive adhesive, etc.). The conductive adhesive may be a conductive glue, a conductive adhesive film, a conductive rubber ring, a conductive adhesive tape, etc. The connecting board 1031 may include at least one opening 1033. An element (e.g., the diaphragm of the air conduction microphone) for obtaining a sensing signal in the energy conversion component may be connected with the first sensing cavity 1050 through the opening 1033.

By connecting the shell 240 of the sensing element 1010 to the connecting board 1031, the sensing element 1010, the connecting board 1031, and the energy conversion component connected to the connecting board 1031 may form a sensing device. A connection method between the shell 240 and the connecting board 1031 may include a bonding connection, a clamping connection, a welding connection, a riveting connection, a nailing connection, etc. At this time, the elastic component 820, the shell 240, the connecting board 1031, and the element of the energy conversion component for obtaining the sensing signal may jointly form a closed sensing cavity (such as the sensing cavity 250). The first sensing cavity 1050 may be a part (e.g., a sub-cavity) of the closed sensing cavity. The connecting board 1031 and the element for obtaining the sensing signal of the energy conversion component may form second sidewall of the closed sensing cavity.

The first sidewall formed by the elastic component 820 may be provided with at least one convex structure 823. The at least one convex structure 823 may reduce the volume of the sensing cavity or part of the first sensing cavity 1050 to increase the sensitivity of the sensing device. In some embodiments, when the sensing element 1010 forms a sensing device with the energy conversion component, the at least one convex structure may be configured to abut against the second sidewall of the sensing cavity. When the sensing device 1010 is in the working state, the elastic component 820 may drive the at least one convex structure 223 to vibrate and be squeezed by the second sidewall of the sensing cavity, resulting in elastic deformation. When the at least one convex structure is elastically deformed, the volume change of the sensing cavity may be improved, so as to improve the sensitivity of the sensing device 1010. In addition, the existence of the at least one convex structure may effectively reduce the contact area between the elastic component 820 and the second sidewall of the sensing cavity, prevent adhesion with the second sidewall forming the sensing cavity and improve the stability and reliability of the sensing device 1010.

It should be noted that the connecting board 1031 may also be a part of the sensing element 1010, the specific type of energy conversion component may form a sensing device together with the sensing element 1010 by connecting to the connecting board 1031. At this time, the elastic component, the shell 240, and the connecting board 1031 may form component of the first sensing cavity 1050.

The above description of the structure of the sensing element 1010 is only a specific example and should not be regarded as the only feasible embodiment. Obviously, for those skilled in the art, after understanding the basic principle of bone conduction loudspeaker, various modifications and changes in form and detail may be made to the specific methods and steps of implementing the sensing element 1010 without departing from this principle, but these modifications and changes are still within the scope described above. For example, the sensing element 1010 may not include a mass unit 260. For another example, when the sensing element 1010 is connected with the connecting board 1031 of the acoustic transducer, the at least one convex structure 223 may not abut against the second sidewall formed by the connecting board 1031.

The basic concepts have been described above. Obviously, to those skilled in the art, the disclosure of the invention is merely by way of example, and does not constitute a limitation on the present disclosure. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

In addition, those skilled in the art may understand that various aspects of the present disclosure may be illustrated and described through several patentable categories or situations, including any new and useful processes, machines, products or combinations of materials or any new and useful improvements to them. Correspondingly, all aspects of the present disclosure can be completely executed by hardware, software (including firmware, resident software, microcode, etc.), or a combination of hardware and software. The above hardware or software can be referred to as "data block", "module", "engine", "unit", "component" or "system". In addition, aspects of the present disclosure may appear as a computer product located in one or more computer-readable media, the product including computer-readable program code.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". Unless otherwise stated, "about," "approximate," or "substantially" may indicate ±20% variation of the value it describes. Accordingly, in some embodiments, the numerical parameters set forth in the description and attached claims are approximations that may vary depending upon the desired properties sought to be obtained by a particular embodiment. In some embodiments, numerical data should take into account the specified significant digits and use an algorithm reserved for general digits. Notwithstanding that the numerical ranges and parameters configured to illustrate the broad scope of some embodiments of the present disclosure are approximations, the numerical values in specific examples may be as accurate as possible within a practical scope.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A sensing device, comprising:
    an elastic component;
    a sensing cavity, wherein the elastic component forms a first sidewall of the sensing cavity; and
    an energy conversion component configured to obtain a sensing signal and convert the sensing signal into an electrical signal, the energy conversion component being in communication with the sensing cavity, and the sensing signal relating to a change of a volume of the sensing cavity,
    wherein at least one convex structure is arranged on one side of the elastic component facing toward the sensing cavity, the elastic component driving the at least one convex structure to move in response to an external signal, and the movement of the at least one convex structure changing the volume of the sensing cavity, wherein the at least one convex structure abuts against a second sidewall of the sensing cavity, the second sidewall is opposite to the first sidewall, the at least one convex structure has elasticity, when the at least one convex structure moves, the at least one convex structure producing elastic deformation, and the elastic deformation changing the volume of the sensing cavity.

2. The sensing device of claim 1, wherein an interval between a pair of adjacent convex structures of the at least one convex structure is 1 μm-2000 μm.

3. The sensing device of claim 1, wherein an interval between a pair of adjacent convex structures of the at least one convex structure is 10 μm-500 μm.

4. The sensing device of claim 1, wherein a height of each of the at least one convex structure is 1 μm-1000 μm.

5. The sensing device of claim 1, wherein a height of each of the at least one convex structure is 10 μm-300 μm.

6. The sensing device of claim 1, wherein the elastic component includes an elastic film and an elastic microstructure layer, and the at least one convex structure is arranged on the elastic microstructure layer, the sensing device further including:
    a mass unit arranged on a surface of the other side of the elastic component, the mass unit and the elastic component vibrating together in response to the external signal; and
    a shell accommodating the elastic component, the mass unit, the sensing cavity, and the energy conversion component.

7. The sensing device of claim 6, wherein the elastic microstructure layer and the elastic film are made of a same material.

8. The sensing device of claim 6, wherein the elastic microstructure layer and the elastic film are made of different materials.

9. The sensing device of claim 6, wherein a thickness of the elastic film is 0.1 μm-500 μm.

10. The sensing device of claim 6, wherein a thickness of the elastic film is 1 μm-200 μm.

11. The sensing device of claim 6, wherein a difference between a height of each of the at least one convex structure and a height of the sensing cavity is within 10%.

12. The sensing device of claim 6, wherein a thickness of the mass unit is 1 μm-1000 μm.

13. The sensing device of claim 6, wherein a thickness of the mass unit is 50 μm-500 μm.

14. The sensing device of claim 6, wherein a resonance frequency of a resonant system formed by the mass unit and the elastic component is 1500 Hz-6000 Hz.

15. The sensing device of claim 6, wherein a resonance frequency of a resonant system formed by the mass unit and the elastic component is 1500 Hz-3000 Hz.

16. The sensing device of claim 6, further comprising:
    another elastic component, the another elastic component and the elastic component being arranged on two sides of the mass unit symmetrically, and the another elastic component being fixedly connected with the shell.

17. A sensing element, comprising:
    an elastic component; and
    a first sensing cavity, wherein the elastic component forms a first sidewall of the first sensing cavity,
    wherein at least one convex structure is arranged on one side of the elastic component facing toward the first sensing cavity, the elastic component driving the at least one convex structure to move in response to an external signal, and the movement of the at least one convex structure changing a volume of the first sensing cavity, wherein the sensing element is attached to a transducer, the transducer is placed opposing the elastic component to form a closed sensing cavity, and the transducer converts a volume change of the closed sensing cavity into an electrical signal, wherein the at least one convex structure abuts against a second sidewall of the sensing cavity, the second sidewall is opposite to the first sidewall, and the at least one convex structure has elasticity.

18. A sensing element, comprising:
    an elastic component; and
    a sensing cavity, wherein the elastic component forms a first sidewall of the sensing cavity;
    wherein at least one convex structure is arranged on one side of the elastic component facing toward the sensing cavity, and Young's modulus of the at least one convex structure is 100 kPa-1 MPa, the elastic component causing at least one of movement and deformation of the at least one convex structure in response to an external signal, and the at least one of the movement and deformation of the at least one convex structure changing the volume of the sensing cavity, wherein the at least one convex structure abuts against a second sidewall of the sensing cavity, the second sidewall is opposite to the first sidewall, and the at least one convex structure has elasticity.

* * * * *